Oct. 22, 1974   J. R. DAVIES   3,843,440
LABELING MACHINE
Filed May 1, 1972   10 Sheets-Sheet 9

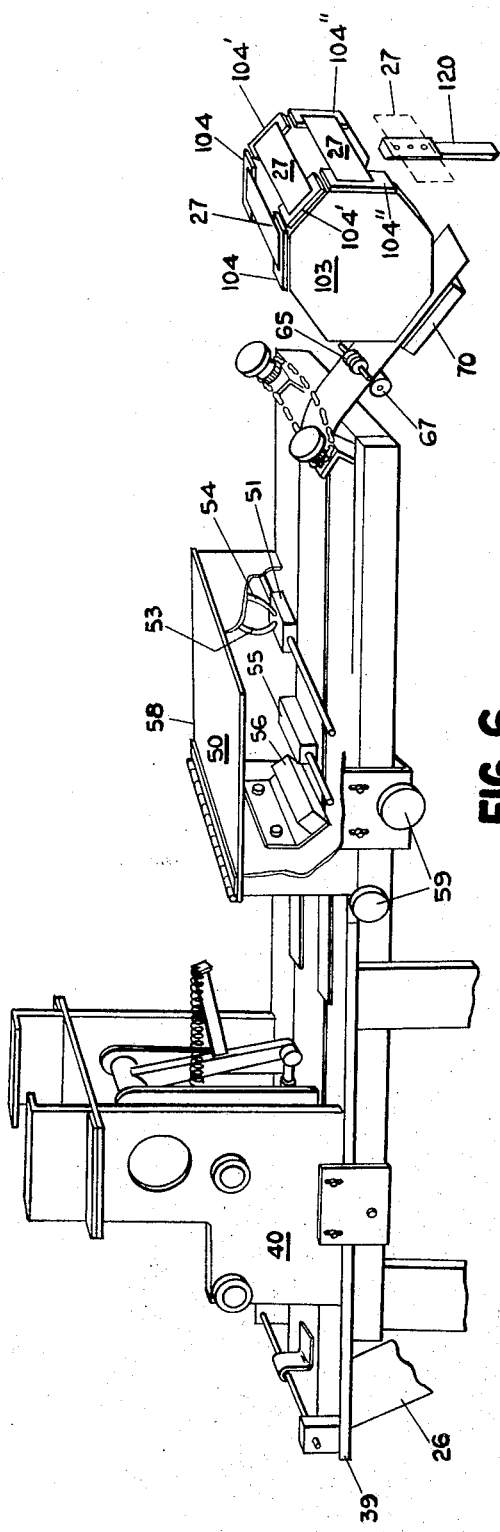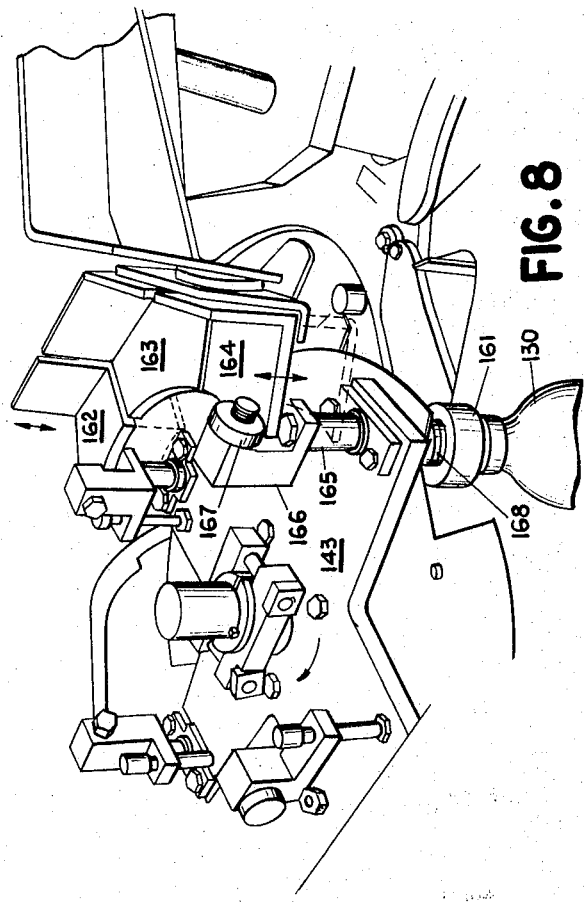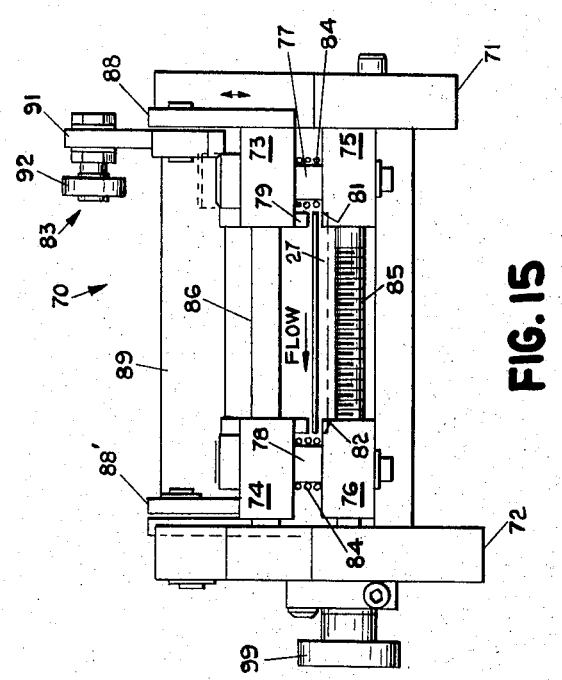

Oct. 22, 1974   J. R. DAVIES   3,843,440
LABELING MACHINE

Filed May 1, 1972   10 Sheets-Sheet 10

United States Patent Office 3,843,440
Patented Oct. 22, 1974

3,843,440
LABELING MACHINE
John R. Davies, Grand Rapids, Mich., assignor to Oliver Machinery Company, Grand Rapids, Mich.
Filed May 1, 1972, Ser. No. 238,433
Int. Cl. B26d 5/00
U.S. Cl. 156—354          28 Claims

ABSTRACT OF THE DISCLOSURE

An improved labeling apparatus for the application of labels cut from label rolls or webs printed by the offset method and having periodic scrap sections, to product surfaces, such as bottles, held in their normal upright position, at extremely high rates of speed, and inspecting and verifying the horizontal, vertical and skew position of the labels on each bottle. The improved apparatus includes novel means for unwinding the label web at a constant rate, a novel two-bladed knife means having both blades operating simultaneously for separating the labels from the web and the periodic scrap section from the label, a novel rotational transfer means for transferring the bottles from an infeed conveyor to a label application station and a label inspection and verification station and novel photoscanning means for inspecting and verifying the exact alignment of the labels on the bottles. Said transfer means includes three rotational transfer wheels and means for providing a positive double three-point engagement for holding the bottles in an exact position during transfer between the three wheels.

BACKGROUND OF THE INVENTION

This application relates to labeling machines, and more particularly, to labeling machines of the roll-feed type in which labels printed on a continuous roll or web having periodic scrap sections are separated from the roll or web and individually applied to product surfaces.

In recent years, labeling machines have been devised to utilize continuous rolls of labels printed by means of the offset printing process. Particularly in the pharmaceutical industry, where the highest standards of accuracy and exactness are required for labels applied to containers containing drugs and the like, the offset printing method has been found to be very desirable in that it is susceptible of continuously and rapidly printing high quality, accurately printed labels. One drawback to the use of label rolls printed by the offset method however, is that the method produces a scrap section regularly and periodically along the roll of labels where the circumferential printing plates are joined. Because of recent demands for faster and faster label cutting and applying machines, new apparatus must specially handle and cut the labels and separate the scrap sections from the labels.

Also, prior labeling machines have been somewhat limited in their ability to transfer the product surfaces, containers or the like, to be labeled, to and from a label application station or portion of the machine at extremely high rates of speed such as 180 product surfaces per minute. Systems such as those in U.S. Pat. 3,586,570, although entirely adequate at lesser label application speeds of about 75 to 120 product surfaces per minute cannot accommodate the increased speeds demanded and still remain completely accurate, particularly with larger bottles.

Another feature of prior labeling machines utilizing roll or web feed labels is that of inspecting the labels in order to verify that they are properly and accurately imprinted with the necessary information and also that they are properly positioned on the product surfaces. Again, especially in the pharmaceutical industry, it is crucial that drug containers be properly indentified as to contents, expiration date, batch number, labeling date, etc. Prior labeling machines have used various methods to inspect and verify the labels but all are somewhat limited in speed of operation. One prior labeling machine, devised to both check the imprinting of the label and verify its position on the product surface is the one described in U.S. Pat. No. 3,586,570. In that machine the batch number, expiration date and labeling date are imprinted, checked on the label, and verified for position on the product surface by means of a photoscanning device subsequent to the application of the label to the product surface. Basically, the photoscanning device in that machine compares the intensity of light reflected from indicating dots through a masked photocell in order to verify the label position. If the intensity of light from each dot was not within acceptable limits when compared, the product surface including that label was rejected by the machine. Although this machine serves well at lower speeds such as 75 to 120 product surfaces per minute with smaller bottles, its ability to accommodate higher labeling speeds, such as 150 to 180 product surfaces per minute, is limited particularly with larger bottles due to the fact that the product surfaces have to be held in an exact position in order to properly verify the labels through the masked photocell. Hence, with the higher machine speeds, the inertial and centrifugal forces imposed on the product surfaces or containers as they are fed through the machine made this exact positioning much more difficult.

Therefore, the need was apparent for a new labeling machine which could accommodate the higher speeds and larger sizes required by the industry, which could utilize label rolls or webs printed by the offset method, which could imprint information required by the pharmaceutical industry on the labels at the time when the labels were applied to the product surfaces, which could verify that information and the position of the label on a product surface, and which could accept or reject the labeled product surfaces in response to the verification.

SUMMARY OF THE INVENTION

Accordingly, it is an object and feature of this invention to provide a labeling apparatus including a novel three-element transfer means for rotationally transferring the product surfaces or containers to be labeled in their normal, upright orientation in which they enter the machine. It transfers them from an infeed conveyor to and from a label application station and to and from a label verification station at a very high rate of speed, with the surfaces or containers being held in a positive double-three point engagement during the upright transfer between each of the three elements.

It is another object of this invention to provide an improved labeling apparatus which will accommodate label rolls or webs printed by the offset method and having periodic scrap sections, which is able to separate the scrap from the labels and the labels from one another by utilizing a special double-edge cutting means having both edges operating simultaneously and at all times.

It is yet another object and feature of this invention to provide a labeling apparatus including an improved means for imprinting required information at the time of labeling on the labels, verifying the imprint, and inspecting and verifying the position of the label on the product surface or container subsequent to the application of the labels to the product surface.

These and other objects and features of the present novel labeling apparatus are accomplished by providing a labeling machine in accordance with the following description. The present novel labeling apparatus is an improved labeling apparatus for the application of labels cut from a label roll or tape having periodic scrap sections to product surfaces. It incorporates means for advancing the labels to a label application station, special means for advancing product surfaces to the label application station, means for applying the labels to the product surfaces at the label application station, and means for intermittently controllably driving both the label and product surface means. The label advancing means and the product surface advancing means operate independently and simultaneously, yet are coordinated to advance a label ready for application and a product surface ready for the application of the label to the same point in the machine at the same time. Following the application of the label to the product surface, the label is carried by the product surface to the inspection and verification station where the label and product surface are checked to determine whether they will be accepted or rejected. In the label advancing means, the labeling apparatus includes the following improvements. The label tape is withdrawn from the label roll by novel means for unwinding the tape at a constant rate prior to the tape being fed into means for imprinting information on the individual labels of the tape, and prior to the tape being fed into means for verifying the imprinted information on the labels. Following the imprinting and verification, the tape is fed into a novel means for separating the labels and the periodic scrap section in one operation. The separated labels are then intermittently advanced toward the label application station while being heated and prepared for application to the product surfaces.

Simultaneously, with the operation of the label advancing means, the product surface advancing means are operating and include the following improvements. The product surfaces are fed to the label application station by means of a novel three-element transfer means which rotationally transfers the product surfaces in their normal upright position from an infeed conveyor to and from the label application station and subsequently to and from the label position verification station. The transfer means holds the product surfaces in a positive double-three point engagement during the transfer between respective ones. Specifically included in the transfer means are novel means for clamping the product surfaces for positive retention in the second of the three elements, such that the product surfaces are held in exact alignment with the label application means, thereby insuring the exact positioning of the label on the product surface. After the label is transferred and applied to the product surface, the combined product surface and label are advanced to the label position verification station. At this station there is included novel means for inspecting and scanning the labels on the product surfaces to verify the exact alignment of the labels on the surfaces and to determine whether the label surfaces should be accepted or rejected.

These and many other objects, advantages and features of the invention will become apparent from a study of the following description taken in conjunction with the drawings.

BRIEF DESCRIPTION OF THE DRAWINGS

FIG. 6 is a fragmentary, perspective view of the label advancing apparatus;

FIG. 8 is a perspective view of the cammed bottle clamping mechanism;

FIG. 15 is an end elevation of the label separation means shown in FIGS. 13 and 14 taken from line 15 in FIG. 14;

DESCRIPTION OF THE PREFERRED EMBODIMENT

General description

Figure 1:
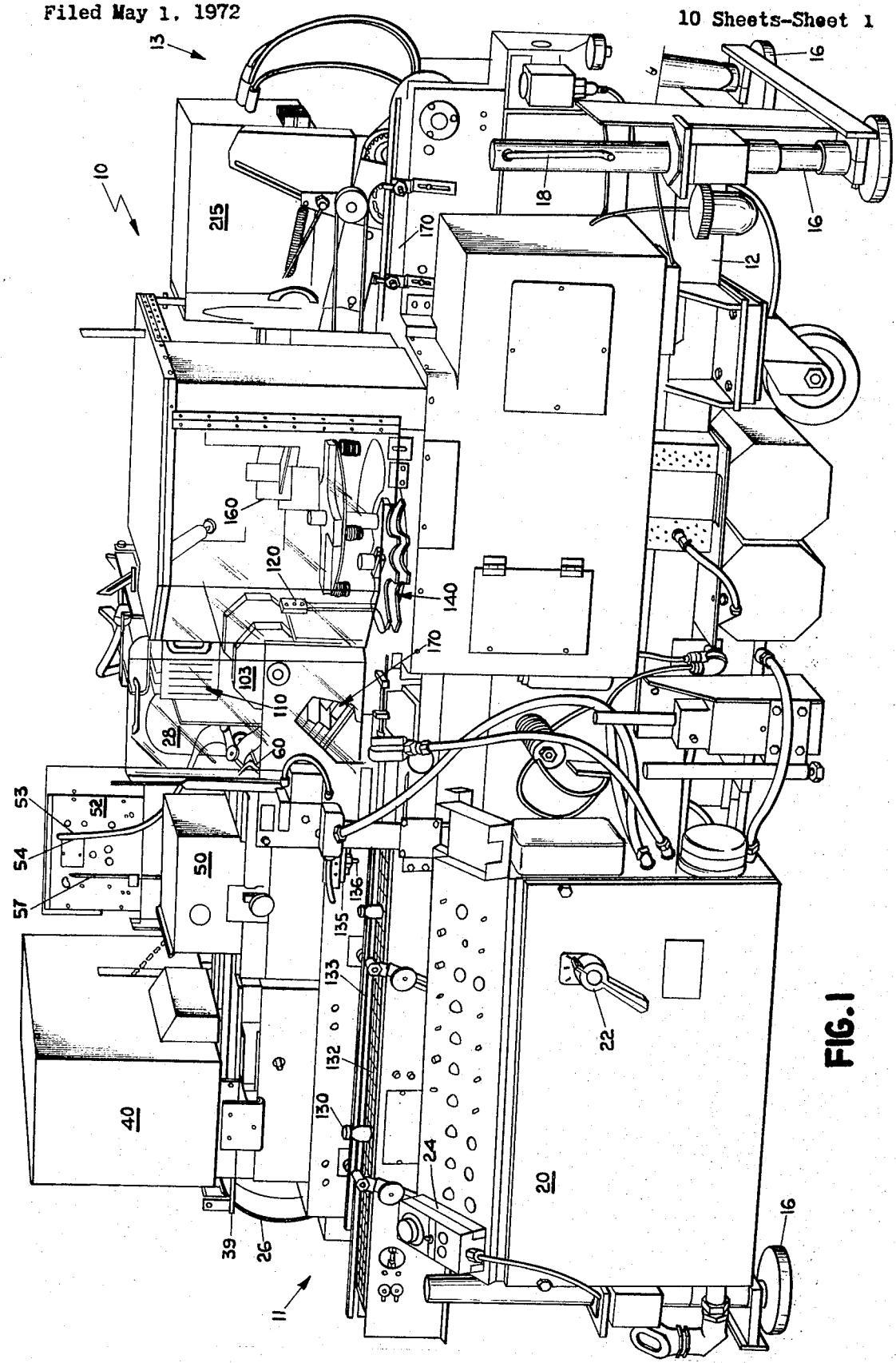
FIG. 1 is a front perspective view of the complete labeling apparatus.
Figure 2:
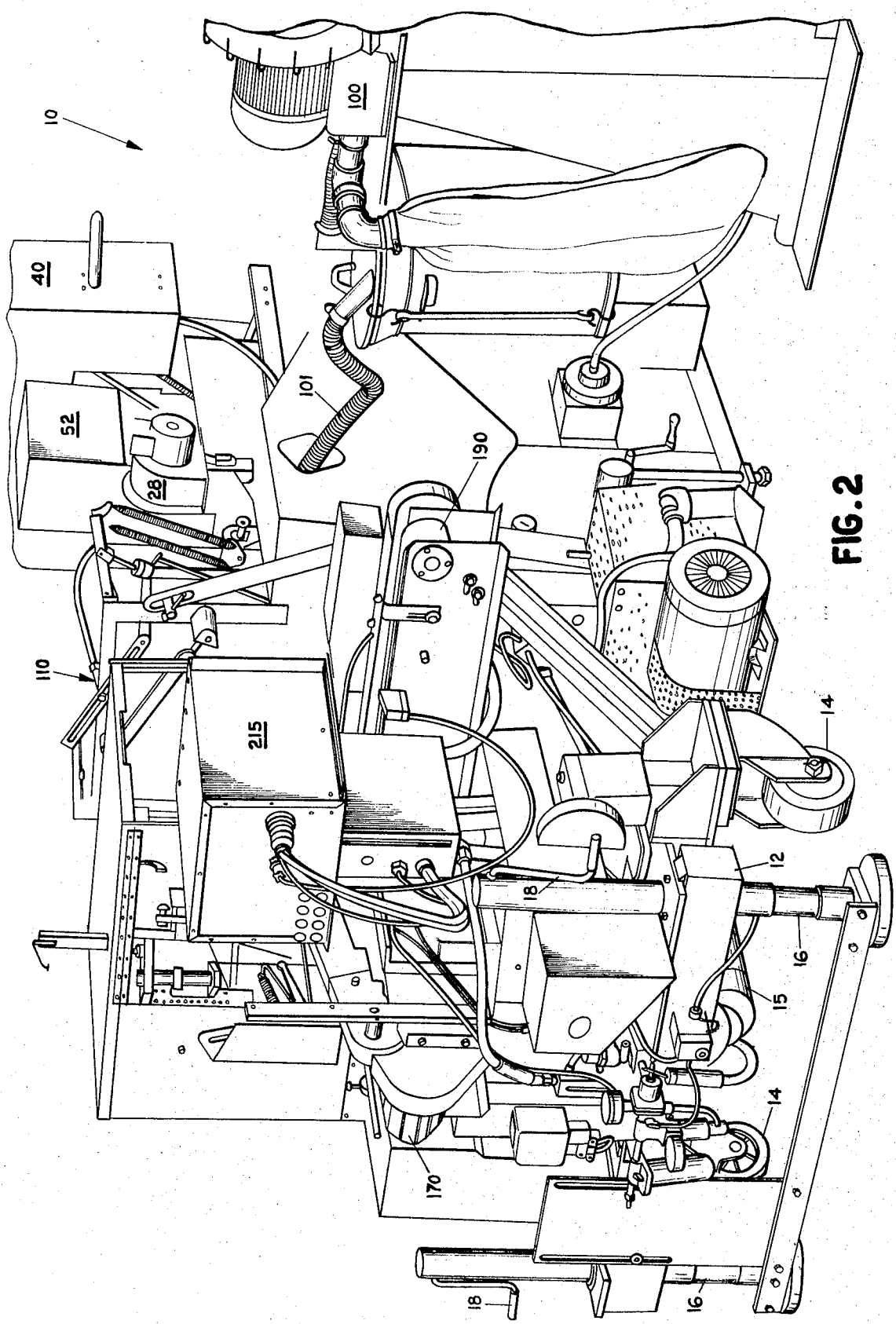
FIG. 2 is a rear perspective view of the complete labeling apparatus taken from the discharge end of the machine.

Referring now to the drawings in greater detail, FIGS. 1 through 4 show the present novel labeling apparatus 10 in its assembled and operational form. The labeling apparatus 10 comprises a frame 12 movably mounted on casters 14 and stabilized when in operation by jacks 16 which may be cranked up or down by cranks 18. The label infeed apparatus or label head, more fully described below, is adjustably mounted on frame 12 such that the vertical, horizontal, and skew position of the labels applied to the product surfaces by the labeling apparatus 10 may be adjusted. Additionally, the product surface advancing apparatus, the label inspection and verification apparatus for inspecting and verifying the position of the labels after application to the product surfaces, the discharge apparatus, and the drive means and electrical control means are also mounted on frame 12 but are not necessarily adjustable relative thereto.

The labeling apparatus 10 is alternatively operated from the electrical control panel 20 including a main power on-off switch 22, or a remote control unit 24 including a rheostat for varying the operating speed of the apparatus 10, and a sufficient length of cord to allow the operator to move about the machine. The apparatus 10 is designed to operate on industrial electrical power, i.e., 460 volt 60 cycle alternating current.

As referred to above, the labeling apparatus 10 will be more completely and accurately understood when broken down into its several operating sections. The apparatus 10 basically comprises four operating sections which perform the simultaneous and coordinated functions necessary to the operation of the machine. These four sections are the label advancing apparatus, the product surface advancing apparatus, the label inspection and verification apparatus, and the discharge apparatus. Two drive means are provided for driving the apparatus 10. The first, electric label feed motor 28, drives the label advancing apparatus as will be more particularly described below. The second or main drive means 15 drives the product surface advancing apparatus and the discharge apparatus.

The label advancing apparatus, generally located in the upper portion of the labeling machine 10 and beginning at the infeed end 11 of the labeling machine 10, comprises a series of elements which perform a series of successive operations on the continuous roll or web of labels 26. The label advancing apparatus is driven by an electric motor, the label feed motor 28, which motor drives the label web 26 through the label advancing apparatus intermittently such that each of the operations performed by the various elements may be performed during the stopped periods between the intermittently driven periods.

The label roll or web 26 is controllably unwound from an unwind mechanism 30 (see FIG. 3) through a series of rollers which control the amount of slack in the web 26, and onto a support plate 39. The support plate 39 supports the web 26 for the imprinting, imprint verification, and reading operations to be next performed on the label web.

The label advancing apparatus also includes an imprinter 40 and a reader means 50 for verifying the imprinting of information by the imprinter 40 and for controlling the positioning of the labels for separation by knife means 70. The reader means 50 is operably connected to a readout unit 52 which produces signals which coordinate the separation and transfer of the labels.

After passing through the reader 50, the label web 26 then passes over the final label adjust roller 60, through the label feed driver rollers 65 and 67 (FIG. 4) and into the label separation means or knife 70. After separation of the individual labels and scrap sections by the knife 70 from the label web or roll 26, the individual labels are transferred by label transfer means 102 (FIG. 19) from the knife 70 to the label transfer drum and heater 103. The transfer drum 103 carries the individual labels to the novel label transfer finger 120 which removes the individual labels from the drum 103 and transports them downwardly to the label application station 145 at the level of the product surface advancing appartus. During this transfer, the labels are heated by the drum and also by the drum and also by quartz element heater 110, shown in its open servicing position in FIG. 4.

Thus, as shown in the schematic representation of FIG. 19, the label web 26 is controllably unwound and intermittently advanced while being imprinted, read, separated into individual labels, transferred and heated, and applied to a product surface 130 by means of a sequential series of operations more fully described below.

The product surface advancing apparatus, also beginning at the infeed end 11 of the labeling apparatus 10 and generally located in the middle area of the apparatus 10, comprises a series of novel elements which successively transfer the individual product surfaces or bottles 130 from the infeed end 11 to the label application station 145, then to the label inspection and verification station 146, and finally to the discharge end 13 of the apparatus 10. The individual product surfaces or bottles 130 are fed into the labeling apparatus 10 on an infeed conveyor 132 which carries the bottles 130 past a bottle cap detector 135 and into the rotational product surface transfer means 140. Before entering transfer means 140, the bottles are slowed by a reciprocating bottle retarder 141 (see FIG. 4). The bottles are then transferred rotationally in their normal upright positions through three intermittently driven transfer wheels 142, 143 and 144. These three wheels carry the bottles successively to the label application station 145, the label inspection and verification station 146, and thence to either the accept conveyor 170 or the reject conveyor 190. The transfer between each of the three transfer wheels is accomplished by means of a novel double three-point engagement mechanism (see FIGS. 9, 10 and 11), and the bottles are securely held in exact position on the second transfer wheel 143 by means of a novel cap clamping mechanism 160. Thus, the individual bottles may be transferred from the infeed conveyor 132 at high rates of speed through the three rotational transfer wheels 142, 143 and 144 during which time labels are applied at the label application station 145 and inspected and verified at the label inspection and verification station 146, prior to being fed out of the labeling apparatus 10 by means of either the accept conveyor 170 or the reject conveyor 190.

The third section of the labeling apparatus 10 comprises the novel label inspection and verification apparatus for inspecting and verifying the position of the label on the product surface or bottle 130 at the label inspection station 146. This inspection and verification apparatus is shown generally at 210 (see also FIGS. 16, 17 and 18).

The fourth section of the labeling apparatus comprises the discharge apparatus and includes the accept conveyor 170, the reject conveyor 190, and the associated cammed bottle cap grippers 180 and 200 for helping to accelerate the bottles as they are moved onto the respective accept and reject conveyors.

As will be more fully apparent below, the four sections of the labeling apparatus 10 operate simultaneously to prepare labels for application to product surfaces, to transfer product surfaces to the label application station, apply the labels to the product surfaces, to inspect and verify the position of the labels on the product surfaces, and to either accept or reject the labeled product surfaces in response to the inspection and verification process.

The several elements of the labeling apparatus described generally above, will now be described in greater detail.

Unwind and Feed Mechanism

Figure 3:
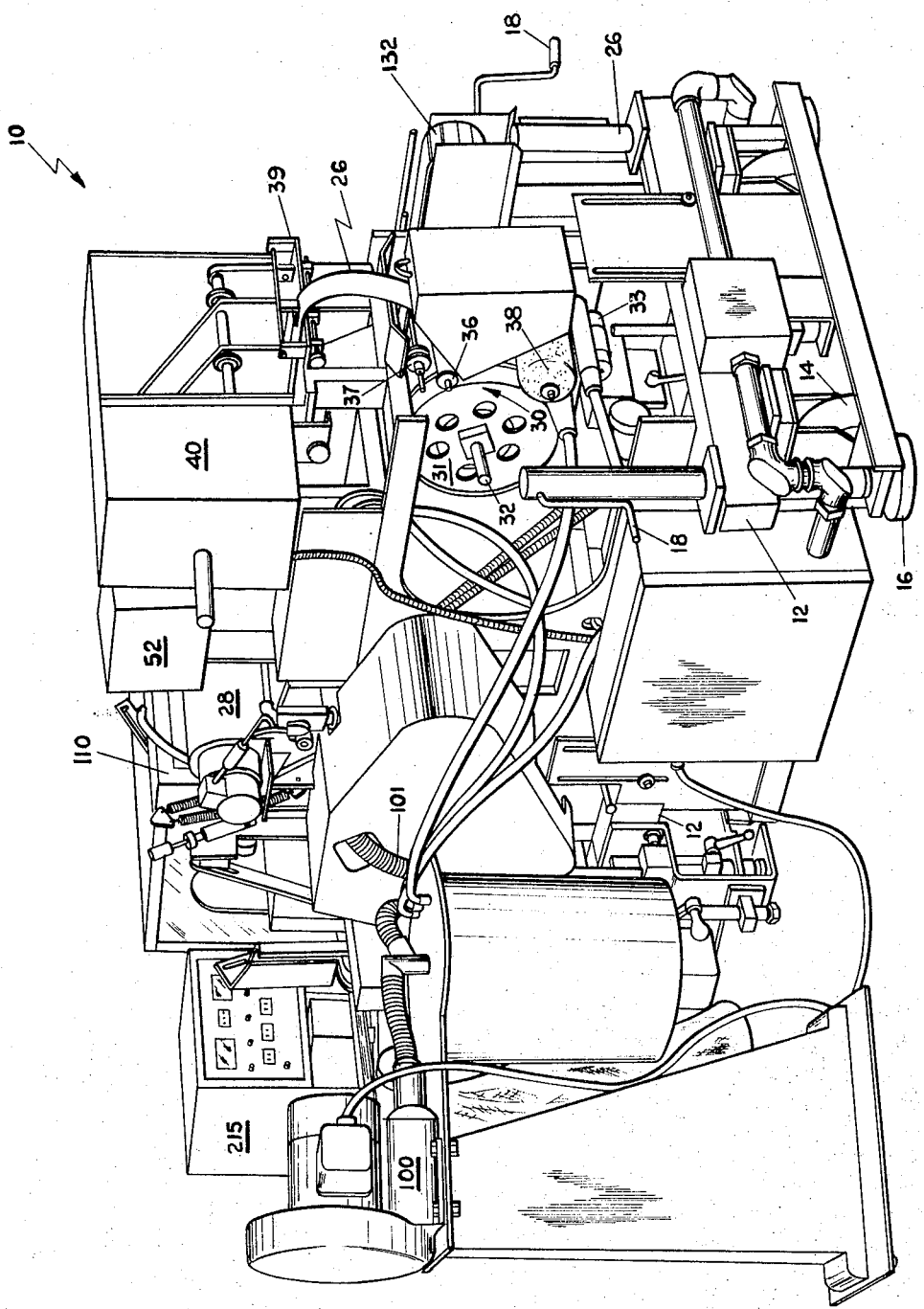
FIG. 3 is a rear perspective view of the complete labeling apparatus taken from the infeed end of the machine.
Figure 19:
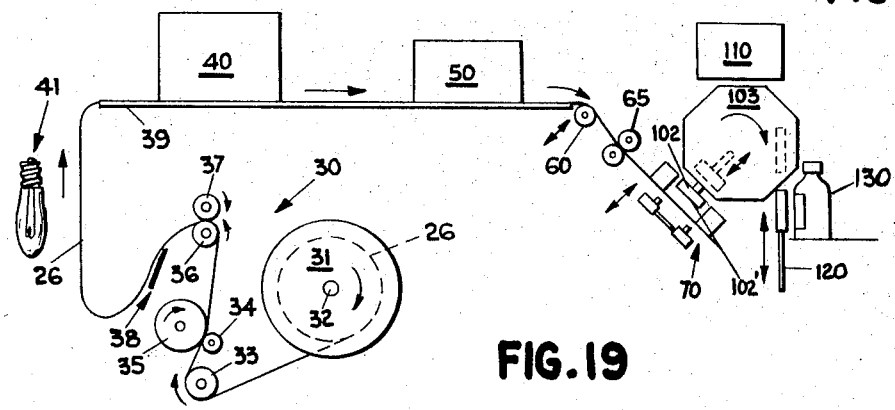
FIG. 19 is a schematic view of the path of the label web through the label advancing apparatus to the label application station.

Referring now to FIGS. 3 and 19, the unwind means or mechanism 30, constituting the beginning point of the label advance apparatus, comprises a freely rotatable unwind reel 31 removably mounted on shaft 32 such that reel 31 may be easily removed in order to insert a fresh label roll or web 26. After leaving the unwind reel 31, the label web 26 follows a sinuous path shown in FIG. 19 around a first freely rotatable guide roller 33 and between a second freely rotatable roller 34 and a driven brush 35. The brush 35 is rotated opposite the direction of flow of the label web 26 and removes any foreign particles which may be resting on the web. The label web 26 then passes through driven rolls 36 and 37. Rolls 36 and 37 are driven by a separate label unwind motor (not shown), as is driven brush 35, which rolls are driven in response to a photocell control means. These drive rollers controllably advance the label web 26 at a rate as required to block the light from lamp 41 from reaching light sensitive photocell 38, which lamp 41 and photocell 38 comprise the photocell control means. Thus, a controlled amount of label web 26 will be maintained as slack between the drive rolls 36, 37 and support plate 39. When the slack amount is drawn into the labeler, and thereby can no longer block the light from lamp or light source 41 from reaching photocell 38, the light from lamp 41 strikes photocell 38 thereby activating the label unwind motor and rolls 36 and 37 to unwind more of the web from reel 31. Thus, a controlled amount of slack in web 26 is maintained. Consequently, rollers 36 and 37 eliminate the sporadic and jerking unwinding action which would otherwise result if label web 26 was pulled directly from unwind reel 31 every time the web was intermittently advanced to knife 70.

Imprinter

Figure 12:
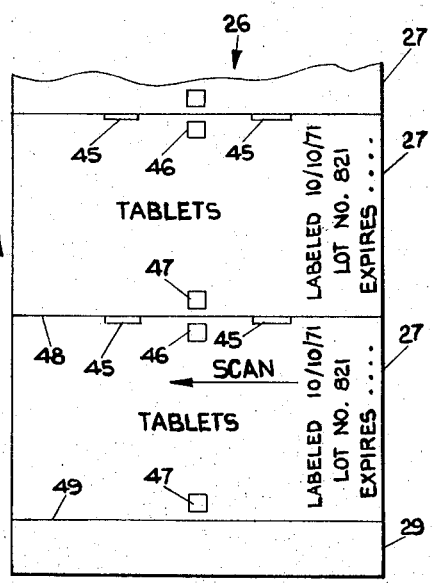
FIG. 12 is a plan view of the label web including two representative labels and a scrap section printed on the web.

Once unwound and supported by support plate 39, the label web next passes through the imprinter 40. Imprinter 40 is similar to that of the type disclosed in U.S. Pat. No. 3,358,570. As shown in FIG. 12, the imprinter 40, driven by main motor 15, imprints information which must be applied at the time the bottles 130 are labeled, such as the expiration date, batch number, labeling date, etc., along one lateral edge of each individual label 27 on the label web 26 as shown in FIG. 12. The imprinter 40 is designed to imprint this information on individual labels 27 only when label web 26 is in its momentary stopped condition to eliminate any smudging of ink which would be encountered if the imprinting occurred while the web 26 was moving. If the label web 26 is stopped for any reason before the imprinter prints the required information on the label, the imprinter 40 is controlled so as to supply fresh ink to it before the next imprint is made. Thus, an accurate and uniform imprint is obtained on each label.

Reader

Following the imprinting, label web 26 passes through reader means 50. Reader means 50 both verifies the imprinting of the expiration date, lot number and labeling date, etc., and coordinates the label feed to knife 70 by reading the register marks 45 on the individual labels 27. Register marks 45 are marks approximately .030" by .125" previously printed on the leading edge 48 of each of the individual labels 27. Preferably this is done with ink normally visible using visible range light. How-whereas the lot number, expiration date, etc., are printed with ink normally visible using visible range light. However, as explained below, the register marks 45 printed with ultraviolet illuminated ink may be replaced by registry holes corresponding in size to the marks formed or punched in the labels. A spot of luminescent paint or tape may then be placed under the areas of the web where the holes are positioned such that the holes will allow fluorescing light to pass therethrough at the proper time in order to properly align and register each label for separation downstream. Thus some type of registry area, either a mark or hole, is printed or formed on each label.

As shown in FIG. 6, reader means 50 includes separately adjustable means for both verifying the imprint and coordinating the web 26 for the cutting operation with knife 70. As depicted therein, an adjustable comparison reading unit 51 is mounted in reader means 50 generally over the area of the individual labels 27 where the imprinted information is placed. The reader unit 51 includes two bifurcated fiber optic cables 53 and 54. The cable 54 is directed such that its light transmitting section transmits light from a light source (not shown) and illuminates the area imprinted by imprinter 40 with light of a wave length which is ordinarily visible, and the light transmtting section of bifurcated cable 53 then transmits light and illuminates a nearby unprinted area of the web. Thus, as each individual label 27 is stopped under reader unit 51, the bifurcated cable 53 has another section which reads the intensity of light reflected by the white area not printed, and cable 54 has another section which reads the intensity of light reflected by the darker or printed area. These cables lead to read-out unit 52 where the contrast or difference in light intensity between the white and darker areas is compared. If the contrast or difference in light intensities is above a certain limit, readout unit 52 indicates that the label has been printed with an imprint from the imprinter 40 and the label is then allowed to continue in the label advancing apparatus. However, if the contrast is not sufficient. read-out unit 52 indicates that the label has not been properly imprinted, and the label advancing apparatus is halted at that point. The comparison of the differential light intensities allows for variation in different types of paper backgrounds, variations in the level of the illuminating light, and for any dirt or dust which may cover the imprinted area without any complex adjustments to the readout unit 52. Thus, the read-out unit need only read a differential and not absolute or definite light levels from the imprinted and nonprinted areas in order to control label passage to the next operation. Consequently, when labels printed on different types of paper are inserted in the labeling apparatus 10, reader unit 50 will automatically compensate for the different types of paper without complex adjustments.

Additionally, comfparison reading unit 51 checks for different label webs spliced onto the existing web 26. Thus, if the new web is spliced onto the existing web 26 with black or other tape which tape covers the printed and unprinted areas normally compared by unit 51 and does not reflect light, the unit will not make the proper light intensity comparison and the labeling apparatuts will automatically shut down. During this shut down period the web may be checked to determine whether the new labels are correct and correspond to the bottles being labeled.

Reader means 50 also includes a separately adjustable separation reader unit 55 and an ultraviolet illuminating source 56. The source 56 illuminates the register area of the labels 27 having the register marks 45 thereon or punched holes therein, to allow unit 55 to pick up the flouresceng light from marks 45 or luminescent paint or tape beneath the registry holes. Separation reader unit 55 includes another fiber optic bundle or cable 57 which transmits the fluorescing light picked up by unit 55 to read-out unit 52 where a cut-off signal is produced stopping the web and causing knife means 70 to cut the web in response to the fluorescing light transmitted through cable or bundle 57. Unit 55 also includes one or more light filters to filter out visible light of wave lengths shorter than the light from the fluorescing marks or registry holes. Additionally, fiber optic bundle 57 itself has a low infrared transmission index to effectively eliminate signals from any non-luminescence printing on the labels. Also, enclosure or box 58 surrounds reader means 50 to help eliminate any interfering light from the outside. Timed activation of reader unit 55 for reading is thus unnecessary since no signals are produced except from the fluorescing marks 45 or registry holes. Adjustment knobs 59 are provided to vary the position of the entire reader means 50 over the label web 26 in order to provide additional means for properly positioning the reading units.

The operation of reader 50 is quite apparent. As each individual label 27 passes under reading unit 55, register marks 45 or the luminescent spots beneath the registry holes, illuminated by ultraviolet light from source 56, provide light to reader unit 55 which transmits a light signal by means of cable 57 to readout unit 52. When such a light signal is received, read-out unit 52 stops drive rollers 65 and 67, thereby providing a stopped period when reader unit 51 verifies the information imprinted on the label. This stopping of the label web also accurately positions the lead label on web 26 at knife means 70 for cutting, since the reader unit 55 is positioned an exact and preset distance away from the cutting blades in knife means 70. In the preferred embodiment the lead label will be exactly one repeat pattern printed by the offset method downstream of unit 55 when web 26 is stopped. After knife means 70 separates the leading label and any scrap section from each other and web 26, the knife drive cam (not shown) activates a synchronizing switch (not shown) which activates drive rollers 65 and 67 to feed another label into knife 70. However, rollers 65 and 67 will not be activated to feed the next label into knife 70 until three other signals are received by read-out unit 52 in addition to the signal from the synchronizing switch and the knife drive cam. These three signals include (1) a signal from reader unit 51 verifying that the label has been imprinted by imprinter 50 (2) a signal from signal means included in the product surface advancing apparatus indicating a product surface or bottle is present in the apparatus at the required location such that the label to be next cut will be coordinated with a bottle being advanced to label application station 145, and (3) a signal from a label jam switch 27 (FIG. 4) indicating no labels are jammed in knife 70. After all of these signals have been received by read-out unit 52, the next label will be fed into knife 70, thereby recommencing the label advancing cycle.

In addition to its other functions, read-out unit 52 also keps a running count of the number of labels passing through reader 50 for later comparison with the number of bottles fed into and labeled by apparatus 10.

It will be apparent, therefore, that only if the proper signals from the verification unit 51 and the separation reader unit 55 are received will the next label 27 be fed into knife 70 by drive rollers 65 and 67.

Drive rollers 65 and 67 have brakes and clutches operably associated therewith which enable the label web to be stopped and started intermittently in response to the signals from the read-out unit 52 within a few milliseconds. When activated the clutches and label feed motor 28 will advance the label into knife 70 at a constant speed. Additionally, a final label adjust roller is provided between reader means 50 and drive rollers 65 and 67 to adjust the position of label web 26 in preparation for its insertion into knife means 70. Although the label cut off location could be adjusted by means of adjusting reader means 50 either in an upstream or downstream direction with respect to the direction of flow of the label web, such an adjustment to the reader means would vary the position of the entire length of the web and thus the imprint made on the label web 26. Consequently, since reader means 50 controls both imprint location and cut off location because it adjusts the position of the entire length of the web, all final adjustments on cut off location alone are made by means of final adjust roller 60.

Knife

Figure 13:
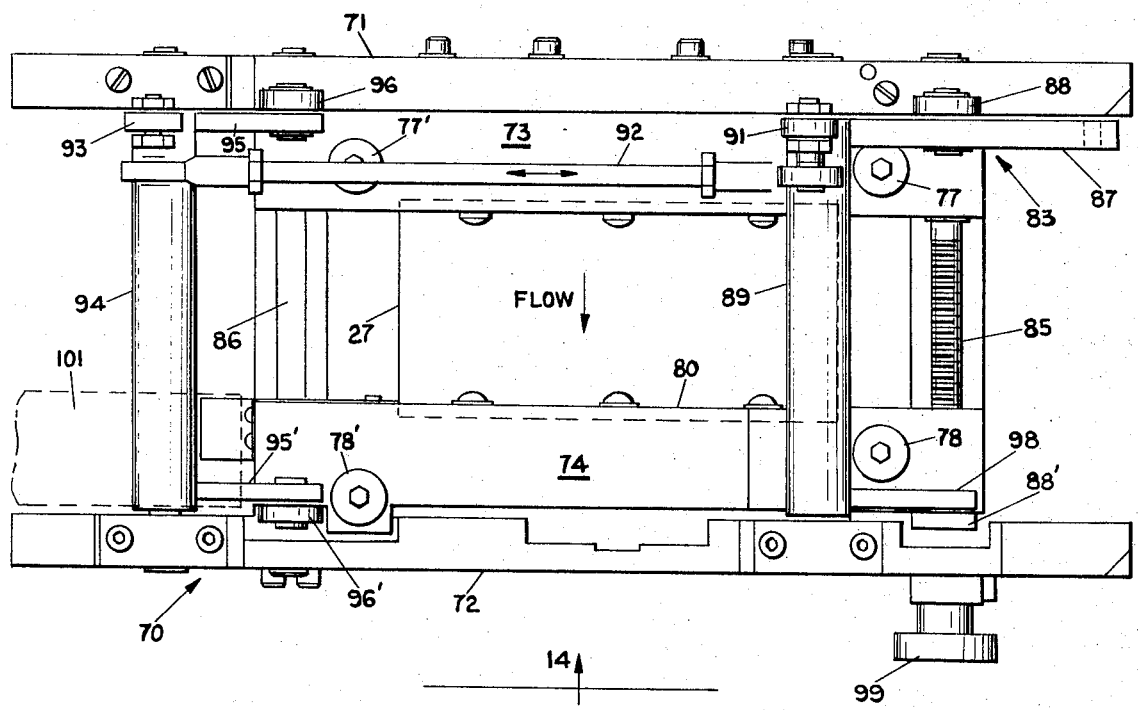
FIG. 13 is a bottom plan view of the label separation or knife means.
Figure 14:
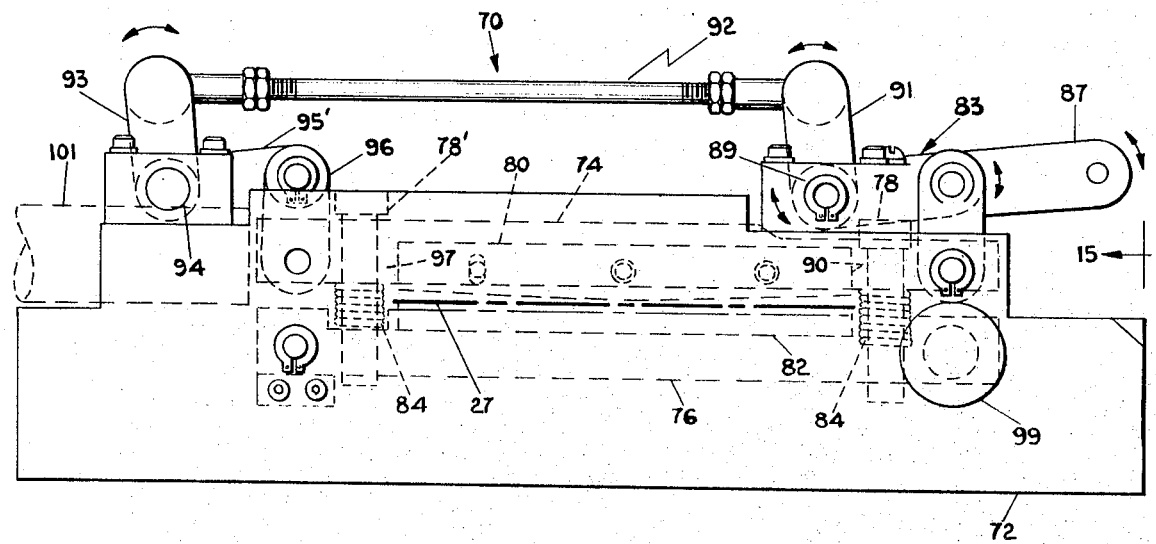
FIG. 14 is a side elevation of the label separation or knife means shown in FIG. 13 taken from line 14 in FIG. 13.

After the proper signals are received by the reader unit 52, a proper length of label web 26 is fed into knife 70 by means of drive rollers 65 and 67. As shown in FIGS. 13, 14 and 15, the separation means or knife 70 comprises a two-bladed cutting apparatus which simultaneously operates both blades during every cutting stroke in order to separate the individual labels from the label web, and the scrap sections from the individual labels. FIGS. 13, 14 and 15 show knife 70 generally inverted from its normal position in apparatus 10. When in position knife 70 has its cutting blades 79 and 80 directed generally upwards and the cutting stroke is generally vertically upwards. Knife 70 comprises two parallel frame members 71 and 72 spaced apart such that knife blade supports 73 and 74 and knife edge blocks 75 and 76 may be adjustably and movably mounted between members 71 and 72. Knife blade supports 73 and 74 are slidably mounted on posts 77, 77', 78 and 78' respectively, such that first knife blade 79 and second knife blade 80 may be reciprocated with respect to knife edges 81 and 82, respectively, by means of reciprocating mechanism 83. Knife blade supports 73 and 74 are biased apart from the respective knife edge blocks 75 and 76 by coil springs 84. Additionally, the cooperating knife blade supports 74 and knife edge block 76 are adjustably mounted with respect to fixed knife blade support 73 and knife edge block 75 by means of threaded rod 85, rod 86 and knob 99. Thus, by rotating knob 99, the second or downstream knife blade 80 and cooperating knife edge 82 may be adjusted along the direction or axis of flow of label web 26, either in an upstream or downstream direction, to enable the knife 70 to separate various sizes, i.e., heights or cut off dimensions, of labels 27 and scrap sections 29.

Reciprocating means or mechanism 83 is operated by the cammed movement of lever 87 up or down about fixed pivot point 89 causing connecting link 88 to move up or down and thus moving end 90 of blade 80 downwardly in FIG. 14. The pivotal movement of lever 87 about point 89 causes connecting link 91 to move to the right in FIG. 14 pulling tie rod 92 towards the right and also moving connecting link 93 on the other end of knife 70 to the right about pivot point 94. The pivotal movement about point 94 causes connecting link 95 to move downwardly, thus causing connecting link 96 to move downwardly as does the left end 97 of blade 80 to which it is connected. Simultaneously and in unison with blade 79, blade 80 is reciprocated due to the movement of lever 87. This is accomplished when the movement of lever 87, as described above, rotates pivot rods 89 and 94, which rods in addition to moving connecting links 91 and 95, respectively, move connecting links 98 and 95'. These connecting links in turn reciprocate links 88' and 96', thereby moving both ends of knife blade 80 and blade support 74 up and down in unison with knife blade 79 and blade support 73. Additionally, as described above, by rotating blade adjustment knob 99, the second knife blade 80 as supported on knife blade support 74, and the cooperating knife edge 82 formed in knife edge block 76, may be moved toward or away from the first knife blade 79 and knife edge 81 by means of threaded rod 85 and slip rod 86. Thus, the space between knife blade 79 and 80 is adjustable in order to accommodate the different length labels which labeling apparatus 10 is capable of applying to product surfaces.

Therefore, when the labeling advance apparatus advances, a label 26 into knife means 70, lever 87 is cammed downwardly as in FIG. 14 (i.e., upwardly in the normal position of knife 70 in apparatus 10), causing blades 79 and 80 to reciprocate in unison to cut label 27 from label web 26 by means of a first knife blade and knife edge 79 and 81, and any scrap section from label 27 by means of blade 80 and knife edge 82. It is apparent then that since the label advance apparatus feeds the next succeeding label in the label web 26 into alignment with knife blades 79 and 80, which blades are aligned with edges 48 and 49, respectively, of the labels shown in FIG. 12, the simultaneous action of blades 79 and 80 will always cut labels 27 along edges 48 and 49, thereby removing the label from the label web 26 and the scrap section 29 from label 27. In order to prevent scrap sections 29 from clogging up the knife mechanism, scrap sections 29 are removed by vacuum means 100 through vacuum tube 101 mounted adjacent second knife blade 80, as shown in FIGS. 13 and 14.

Although labeling appartus 10 and especially knife means 70 is adapted to handle label webs printed preferably with the offset method, the knife means 70 is particularly useful to handle labels printed with other methods. Thus the entire apparatus 10 including knife means 70 is capable of handling webs having no periodic scrap section. In this case the second blade 80 will continue to reciprocate in unison with first blade 79 but will not perform any cutting function. Thus knife 70 and apparatus 10 can accommodate all types of label webs. Additionally, the novel knife concept disclosed herein may be used to perform related operations on the labels. For example, the knife blades may be modified to form round corners on the severed labels. Finally, the reciprocating action of the second knife blade and support presses the labels toward the transfer means 102 and helps maintain the flow and orientation of the labels in the apparatus, which is especially useful in handling label materials with curl.

Transfer means

Once labels 27 have been separated from label web 26 by means of first knife blade 79, and the scrap sections have been removed from labels 27 by means of second blade 80, the individual cut labels 27 are transferred to intermittently driven label transfer drum and heater 103 by means of label transfer means 102. Transfer means 102 is very similar to the transfer means described in U.S. Pat. No. 3,586,570. As described therein and employed in the present invention, transfer means 102 is cammed reciprocally between knife means 70 and label transfer drum and heater 103 and includes vacuum means or openings for holding the label 27 against vacuum transfer surface 102' during the transfer operation. Thus, after the individual labels are separated from label web 26, transfer means 102 is cammed downwardly to knife 70, has its vacuum means activated, and picks up label 27 after the label separation from the strip by knife means 70. Then as shown in FIG. 19, transfer means 102 reciprocates toward the center of transfer drum 103 between the spaced parallel shoes 104 of drum 103, at which point the vacuum means for the transfer means 102 is cut off. As transfer means 102 moves between shoes 104 of drum 103, the vacuum means included in drum 103 holds the lateral label edges by means of vacuum holes 105 in shoes 104. (See FIGS. 6, 7 and 9.) Once label 27 is secured on drum 103 by means of vacuum at holes 105, transfer means 102 is ready to reciprocate back toward knife means 70 to pick up and transfer yet another individually cut label 27.

Drum

Figure 4:
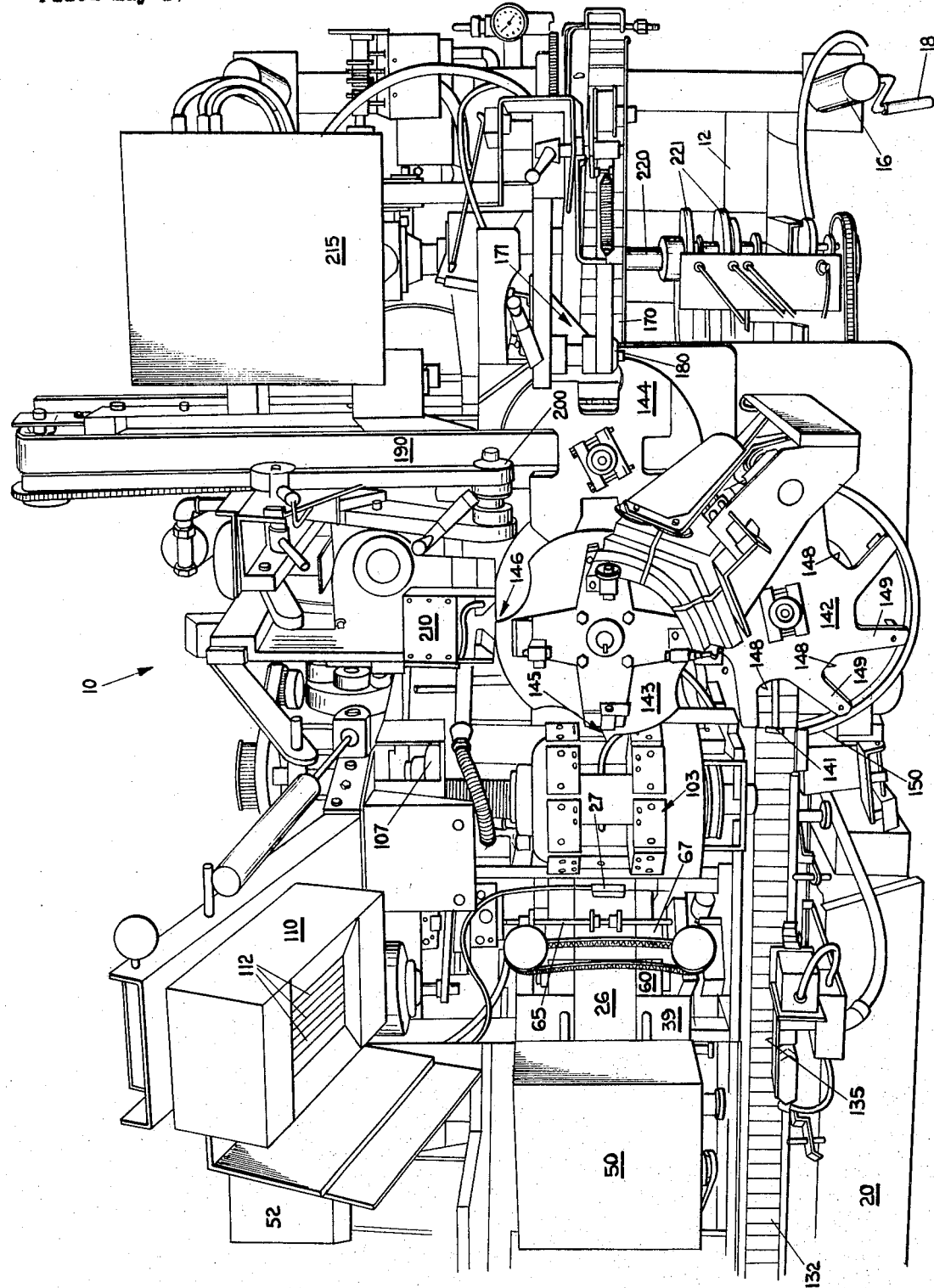
FIG. 4 is a fragmentary, perspective, plan view of the labeling apparatus.

Label transfer drum and heater 103 is very similar to the drum and heater described previously in U.S. Pat. No. 3,586,570. Drum 103 is intermittently driven by means of the main drive motor 15 (FIG. 2) of labeling apparatus 10 through a conventional Geneva drive means 107 (FIG. 4) such that each corresponding pair of shoes 104 is moved through an arc corresponding to ⅛ of a circle or 45 degrees during each period of motion. During the period when labels 27 are carried by drum 103, the portions of the labels 27 in contact with the shoes 104 are also heated by shoes 104 which have electrical resistance heating coils in contact therewith. This causes the heat sensitive adhesive on the back surface of labels 27 to become tacky in preparation for application of the labels to the product surfaces or bottles 130. Labels 27 are carried by drum 103 with their printed sides in contact with shoes 104. When a label has been transported through 225 degrees and is in the position shown by label 27 carried on shoes 104" in FIG. 6, it is ready for transfer by means of label transfer finger 120 from position 104", shown in FIG. 6, to the level of the product surface at label application station 145. The interior portion of each label, which is between and not in contact with shoes 104 of drum 103, is made tacky by the application of heat from a quartz element heater 110 mounted directly over drum 103 as shown in FIG. 1. As shown in FIG. 4, quartz element heater 110 may include a plurality of quartz heating elements 112 which radiate sufficient heat to activate the adhesive on the back of each individual label 27. Together the transfer drum and heater 103 and quartz element heater 110 comprises the activating means for activating the labels 27 prior to application to the product surfaces. Thus, when labels 27 reach the position of shoes 104" shown in FIG. 6, the adhesive coated back surface of each label will be uniformly sticky or tacky and ready for application to the product surface or bottle.

Label transfer finger

Figure 7:
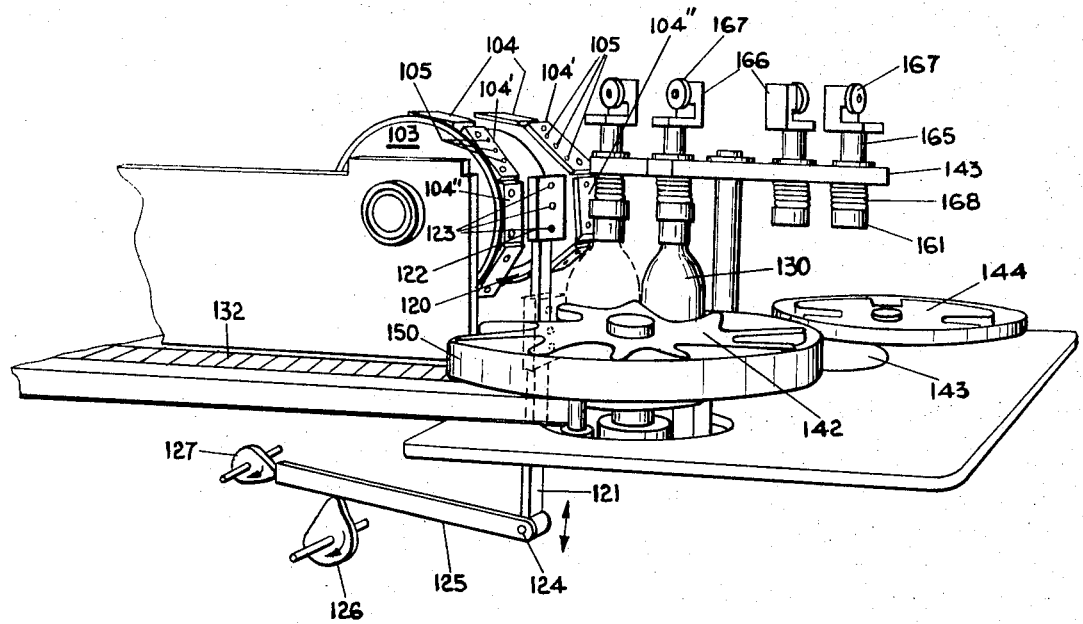
FIG. 7 is a perspective side view of the product surface transfer apparatus and portions of the label advancing apparatus.
Figure 9:
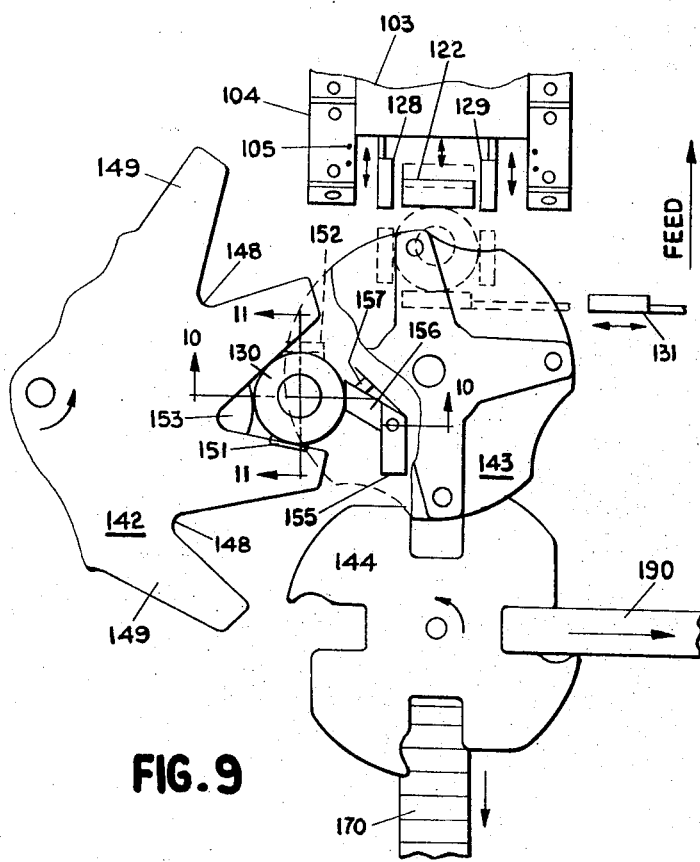
FIG. 9 is a fragmentary plan view of the product surface transfer apparatus and a portion of the label advancing apparatus.

As described above, the label transfer finger or transfer finger means 120, shown in FIGS. 1, 6, 7, 9, and 19, transports the prepared label from transfer drum and heater 103 to label application station 145 at the level of the product surfaces or bottles 130. As shown in FIG. 7, the label transfer finger 120 comprises an elongated support element 121 on which is mounted a rubber head or transporting surface 122 including vacuum openings 123. The support element 121 is pivotally mounted on a pivot rod or member 125, which rod 125 is alternately cammed by camming surfaces 126 and 127. The rotation of camming element or cam 126 causes a vertical movement of transfer finger 120 from the level of transfer drum 103 at the level of shoes 104" to the product surface or bottle 130 level at the bottle application station 145 (shown by the phantom lines), a distance of approximately six inches in the preferred embodiment. Camming element or cam 127 reciprocates the entire label transfer finger 120 between a position behind the plane of the supported label at position 104" to a position at the actual plane of the supported label 27 at 104", a distance of approximately ³⁄₁₆ of an inch in the preferred embodiment. Thus, as shown in FIGS. 6, 7 and 9, head 122 is cammed upwardly by cam 126 behind the plane of the supported label at 104", at which time the cam 127 moves the transfer finger forward approximately ³⁄₁₆ of an inch when vacuum openings 123 adhere the supported label to label transfer finger head 122. The cam element 126 then rotates further and causes head 122 and adhered label 27 to travel downwardly to the level of bottles 32, at which point transfer finger 120 is cammed ³⁄₁₆ of an inch further forward by cam 127, the vacuum to vacuum openings 123 is cut off, and the entrance wiper 128, exit wiper 129, and back wiper 131 reciprocates along the side and back of bottle 130 to secure the heat activated, tacky label to the bottle (see FIG. 9). Following the application of the label by the wipers, cam 127 moves finger 120 back behind the plane of the labels at position 104" and the cycle is repeated.

Thus, the final operation of the label advancing apparatus is performed by the label transfer finger 120 which transports the individually cut labels 27 from the level of drum heater 103 to the level of bottles 130 at the label application station 145 where the labels are applied to the bottles by means of wipers 128, 129 and 131.

Synchronizing

Figure 5:
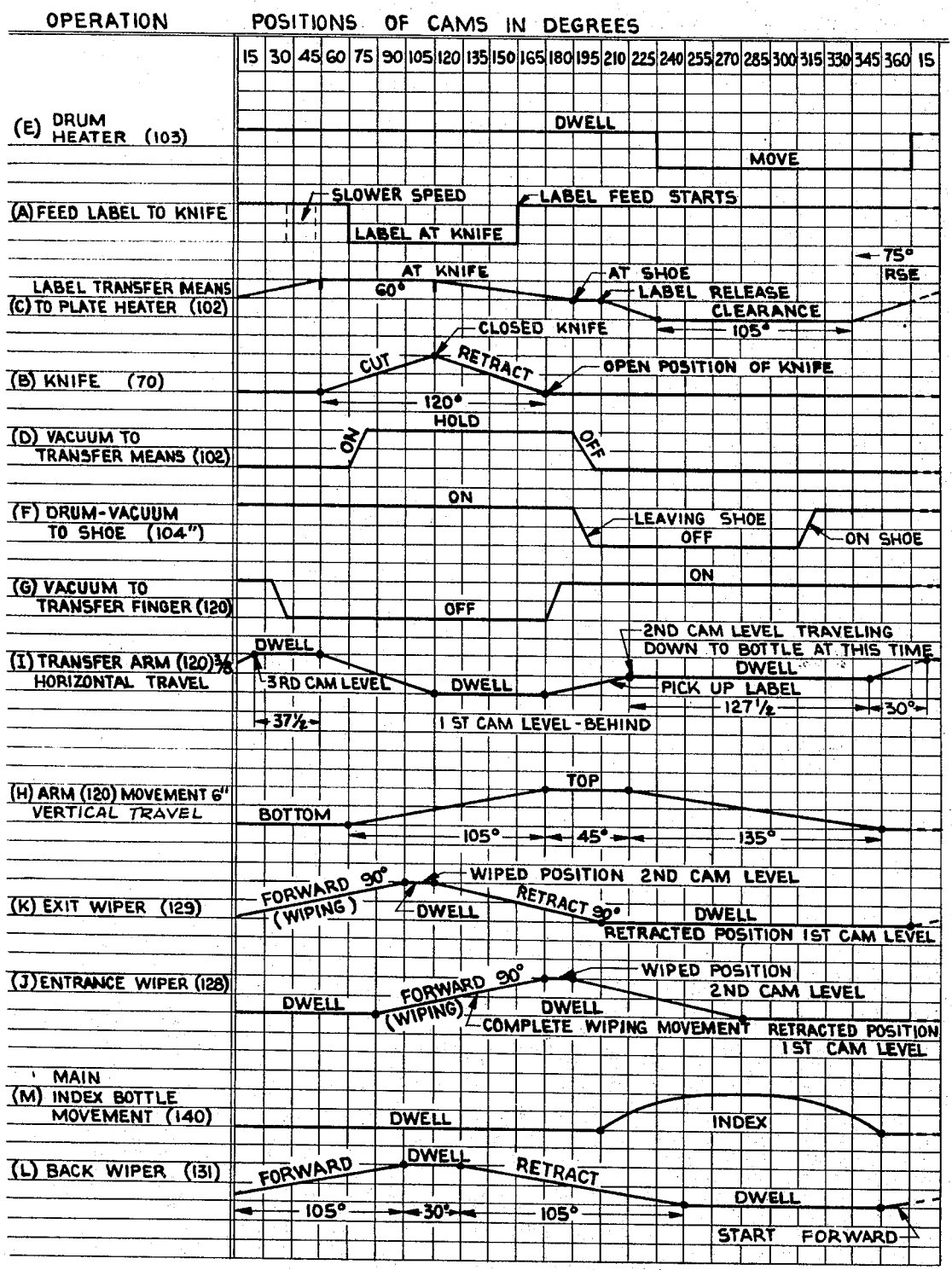
FIG. 5 is a timing chart detailing the sequence and timing of the various operations of the labeling apparatus.

Referring now to FIG. 5, the coordinated intermittent advance of both the label web 26, the individually cut labels 27 and the product surfaces or bottles 130 to the label application station 145 will be described in their timed sequence. Beginning with operation A, the leading edge of label web 26, i.e., either the leading edge of the scrap section 29 or a leading edge of a label 49, is advanced into the knife in response to a signal from readout unit 52, as described above. Fifteen degrees before the label feed stops, the knife, or operation B, begins and the label is cut from label web 26. Simultaneously with operation B, the label transfer means 102 (operation C) reciprocates toward the knife 70. As soon as the separation of the label is completed, the transfer means 102 begins the transportation of the cut label 27 to transfer drum and heater 103. Shortly after transfer means 102 reaches knife 70 operation D causes a vacuum to be applied to surface 102' causing label 27 to be adhered to surface 102'. When the means 102 has transported label 27 to drum shoes 104, operation D continues and cuts off the vacuum to surface 102', when a vacuum in openings 105 removes the label from the transfer means 102 and secures the label to the shoes 104. Shortly thereafter, operation E begins and the transfer drum and heater 103 is rotated through 45 degrees by means of the main drive and the Geneva drive arrangement. The operations A–E continue intermittently until a label is rotated through 225 degrees when the label will be in position of shoes 104" as shown in FIG. 6. Shortly before the label reaches position 104", operation G starts the vacuum through openings 123 in label transfer finger 120 which is then in position at the level of the heater drum 103. The continuation of operation F then cuts off the vacuum to the drum shoes 104" and the vacuum applied to transfer finger 120 by operation G causes the label 27 to be adhered to the transfer finger 120. The transfer finger 120 is then cammed downwardly in operation H to label application station 145 at the level of bottles 130. At this time operation G continues and cuts off the vacuum shortly after the transfer finger 120 has reached the bottle level. Operation I then cams transfer finger 120 backward ⅜ of an inch at which time finger 120 is returning to the level of drum 103 in the continuation of operation H. After operation G has cut off the vacuum to transfer finger 120, operations J and K next occur with the wiping action of the entrance and exit wipers 128 and 129 wiping label 27 onto bottle 130. Note that the exit wiper 129 begins its reciprocal action slightly prior to the beginning of the reciprocating action of entrance wiper 128. This allows slightly more time for the product surface or bottle 130 to be moved into position by the product surface advancing apparatus. Simultaneously, with the side wiping by wipers 128 and 129, operation L occurs as the back wiper 131 reciprocates across the rear of bottle 130 to first wipe the label on the exit wiper side onto the bottle and then to wipe the edge of the label on the entrance wiper side onto the bottle on its return stroke. Once the wiping operations J, K and L have been completed, and all wipers 128, 129 and 131 are retracted or are being retracted, the product surface advancing apparatus or main index bottle movement operation M, which has been in a dwell or stop position from slightly after the time when transfer finger 120 has reached the bottle level until all wiping operations have been completed, then indexes or rotationally transfers the bottle 130, with label 27 applied thereto, to the label inspection and verification station 146.

Infeed apparatus

The product surface advancing apparatus, generally described above, operates simultaneously with the label advancing apparatus in order to advance a product surface or bottle 130 to the label application station 145 at the time when an individual label 27 is ready for application to that bottle 130. The product surface advancing apparatus includes infeed conveyor 132 which transports a continuous line of bottles 130 from the infeed end 11 to the rotational transfer means 140. An adjustable guide rail 133 (FIG. 1) is mounted alongside the conveyor 132 to help guide bottles 130 toward the rotational transfer means 140. Just before the bottles enter the transfer means 140, they pass under a cap detection means or bottle cap detector 135 which is mounted over conveyor 132 and is vertically adjustable relative thereto. The bottle cap detector 135 includes an insertable probe 136 (FIG. 1) which is electrically reciprocated into contact with the bottle cap as each bottle 130 passes beneath the detector 135. If a cap is present, then bottle 130 is assumed to be filled and ready for labeling and detector 135 transmits the appropriate signal allowing the product surface advancing apparatus to continue the advancing operation. However, if a cap is absent on one of the infed bottles 130, detector 135 will produce a signal on control panel 20 indicating the problem and/or shutting down the product surface advancing apparatus.

Rotational transfer means

After bottles 130 pass beneath cap detector 135, they approach the rotational transfer means 140 and the first of the three intermittently driven rotational transfer elements or wheels 142. However, before entering the first rotational transfer element or wheel 142, the bottles are decelerated by the cam operated, reciprocating bottle retarder or retarding means 141 (shown in FIG. 4). Retarder 141 slows the bottles to a stop as they enter the socket spaces or sockets 148 in first transfer wheel 142. Thus, retarder 141 prevents bottles 130 from being broken from the sudden deceleration which could otherwise be encountered if they entered socket 148 without any deceleration. As the individual bottles 130 enter the sockets 148 in wheel 142, the intermittently driven wheel carries them around the circumferential path of travel by means of radially extending spokes 149. Should a jam-up occur when the bottles are entering the sockets 148, the spring loaded bottle release mechanism 150 will swing open, allowing the bottles to be thrown out of the rotational transfer means 140 and onto the floor or into a receiver to prevent damage to transfer means 140, e.g. further along the path of travel of bottles 130. The bottles are carried progressively in a counterclockwise direction around the circumference of the circle defined by the wheel 142 by the intermittent motion of the wheel 142. When the bottles reach the second transfer wheel 142, they are held in their exact alignment and position by means of a novel, double three-point engagement mechanism which allows them to be securely and efficiently transferred from wheel 142 to wheel 143. Wheel 142, which rotates at one-half the revolutions per minute (r.p.m.) of wheel 143, has a diameter of substantial size, but less than twice the size of wheel 143 such that bottles 130 are moved away from spokes or arms 149 after bottles are clamped in wheel 143. Thus, the area of wheel 142 in which the bottles are transported moves at a speed slightly less than the bottle transporting area of wheel 143. This arrangement of wheel size and speed allows bottles 130 to be smoothly transferred away from arms 149 by wheel 143.

Double three-point engagement means

Figure 11:
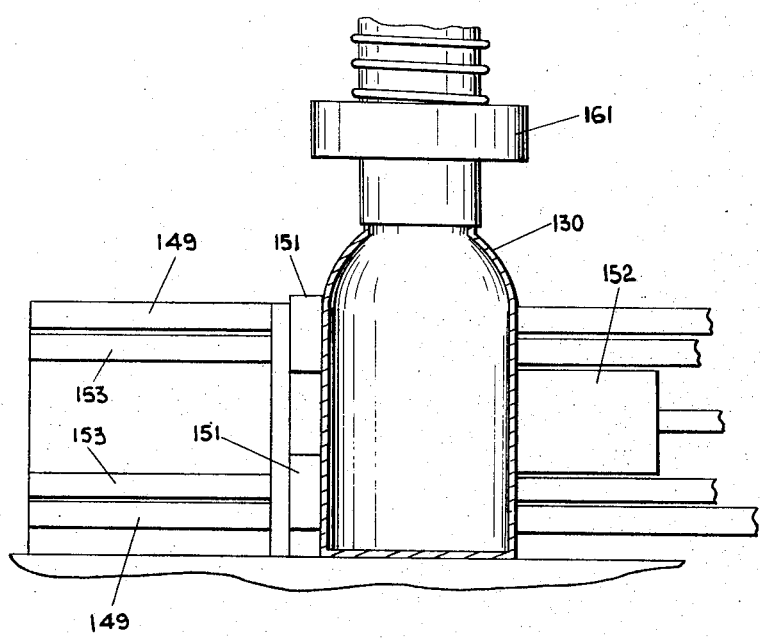
FIG. 11 is a side, elevational cross-sectional view of the product surface transfer apparatus taken along line 11—11 of FIG. 9.

As shown in FIG. 9, each bottle 130 is transferred to wheel 143 while being held on its four opposing sides or quadrants by means of the novel double three-point engagement mechanism. As shown in FIG. 11, a first three-point support engagement is formed by the spoke 149 which contacts the rear of the bottle 130 by means of pads 151 spaced vertically apart on the upper and lower arms 149 of transfer wheel 142 to supply longitudinal, i.e., vertical, stability to the bottle 130. Diametrically opposite pads 151, reciprocating spring block 152 contacts bottle 130 along and on one side or the other end of a bottle diameter running between pads 151. Thus, when taken in combination, the two pads 151 and the reciprocating block 152, which block 152 is cammed into position to contact each bottle as it swings toward transfer wheel 143, provide a three-point, triangular support by means of contact points at either end of one diameter of bottle 130.

Figure 10:
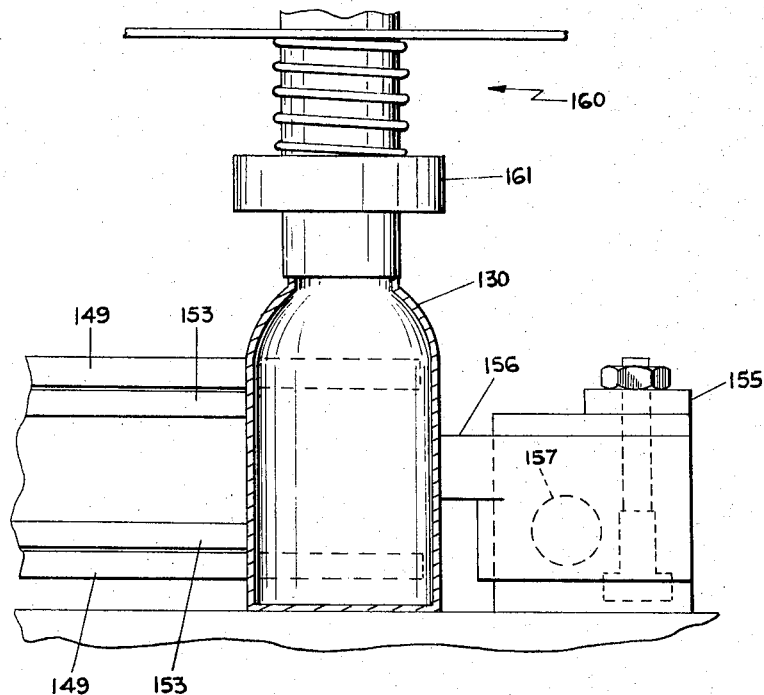
FIG. 10 is a side elevational cross-sectional view of the product surface transfer apparatus taken along line 10—10 of FIG. 9.

Bottle 130 is also supported by a second three-point support engagement along a diameter perpendicular to that shown in FIG. 11, as shown in FIGS. 9 and 10. As depicted in FIG. 10, the bottle 130 is again triangularly supported on opposite ends of a diameter by means of double extending support members 153. As shown in FIG. 9, support members 153 comprise the circumferential edges of two vertically spaced discs mounted between arms 149 of transfer wheel 142. These edges of members 153 additionally support bottle 130 in wheel 142. Diametrically opposing the contact of edges or support members 153, is the spring biased contact mechanism 155. Contact mechanism 155 includes an arm 156 biased into contact with each bottle 130 by means of a coil spring 157. Arm 156 contacts bottle 130 along a diameter thereof, which diameter passes between members 153 such that a triangular support is formed.

Thus, each bottle will be clamped by the six diametrically opposing contact surfaces comprising the two three-point support engagements, as described above, as it is transferred onto transfer wheel 143. The contact surfaces will all be in contact with the bottle during an intermittent stop period. At this point, cap clamping mechanism 160 securely clamps a spring biased clamping or top engaging element 161 downwardly on the securely positioned and accurately held bottle 130 to hold it tightly against the underlying support. After the clamping operation by clamping element 161, spring block 152 is retracted out of the path of bottle 130, and spring biased contact mechanism 155 is pivoted out of the way by bottle 130 as the bottle is rotated with wheel 143, the bottle being securely clamped by clamping element 161 as it so moves.

Clamping means

As shown in FIGS. 1, 7 and 8, the clamping means or cap clamping mechanism 160 comprises a three member platform having platform elements 162, 163 and 164 which cooperate with cap clamping elements 161. Cap clamping elements 161 are supported on posts 165 to which are bolted cam supports 166 which receive freely rotatable roller cams 167. The cap clamping element 161 is biased toward the bottles 130 by coil spring 168. Posts 165, cam supports 166 and roller cams 167 are mounted on the upper disc of wheel 143 thereby causing cap clamping element 161 to clamp bottle 130 between itself and the lower disc of wheel 143 shown in FIG. 7.

As shown in FIG. 8, the operation of the cap clamping mechanism is as follows. The roller cams 167 for each of the cap, i.e. upper, clamping elements 161 first contact platform member 162. As shown by the phantom lines in FIG. 8, the platform 162 is cammed vertically from the position where roller cams 167 first contact platform 162 and raises cap clamping element 161 by means of the roller cam 167 to the level of platform 163 while transfer wheel 143 is at rest. The vertical movement of platform 162 causes cap clamping elements 161 to release the bottles 130 as they are being transferred to the last or third transfer wheel 144. Once the platform 162 is at the level of 163, the cam roller 167 rolls across platform 163 which is in a fixed position. As the individual cap clamping elements 161 approach the area of transfer of bottles from the first transfer wheel 142 to the second transfer wheel 143, the roller cam 167 rolls onto the platform 164 which is also at the level of platform 163. Platform 164 is then cammed vertically downwardly to the position shown by the phantom lines in FIG. 8, thereby moving the cap clamping element 161 downwardly toward the cap of the bottle 130 which is being held by the six diametrically opposed contact points as described above. Thus, the cap clamping elements 161 are lowered to clamp the bottles 130 as they are transferred from wheel 142 to wheel 143 and are raised to release the bottles 130 at the point of their transfer to transfer wheel 144. Both of the raising and lowering operations are performed by vertically reciprocating platforms 162 and 164 respectively.

Once the bottles 130 have been clamped securely between the discs of transfer wheel 143 by means of the cap clamping mechanism 160 and cap clamping elements 161, the bottles are intermittently rotated to the label application station 145 where the labels are transferred to the bottles and securely adhered thereto by wipers 128, 129 and 131, as described above. Following the application of the label, the bottles are intermittently rotated in a clockwise direction to the label inspection and verification station 146 as shown in FIG. 4.

Label inspection and verification apparatus

Figure 16:
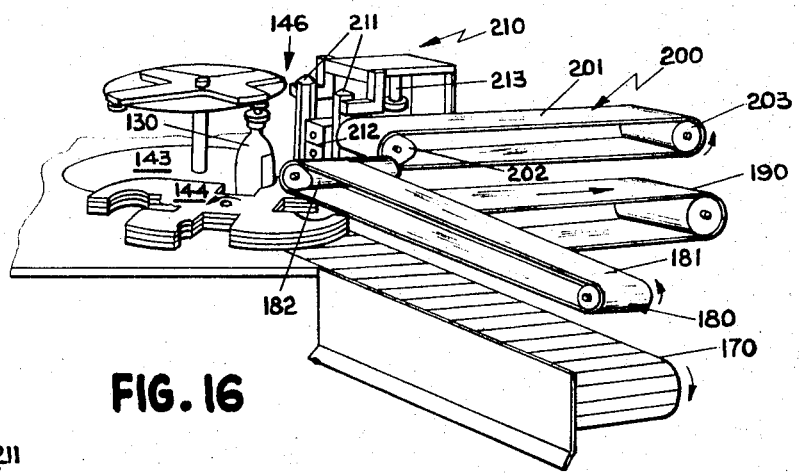
FIG. 16 is a perspective view of the apparatus for inspecting and verifying the labels on the product surfaces and the product surface discharge apparatus.
Figure 17:
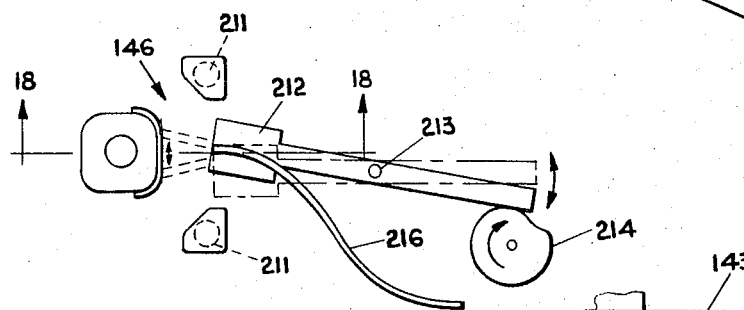
FIG. 17 is a schematic plan view of the apparatus for inspecting and verifying the labels on the product surfaces.
Figure 18:
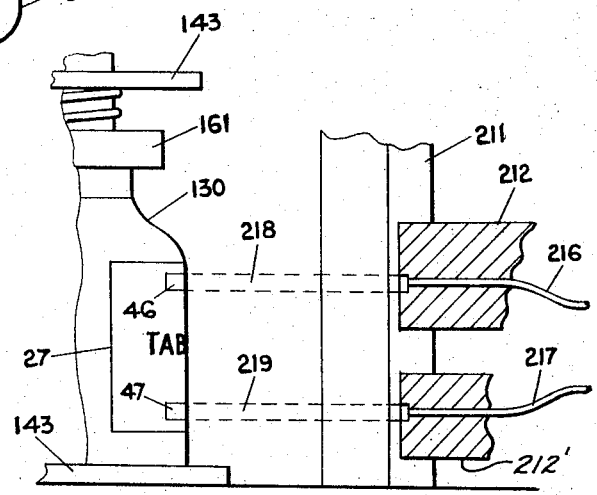
FIG. 18 is a cross-sectional, side elevation of the apparatus shown in FIG. 17 taken along line 18—18 in FIG. 17.

As detailed in FIGS. 4, 16, 17 and 18, the label inspection and verification apparatus or inspection means 210 is located adjacent the circumferential path of the second transfer wheel 143. The labeled bottles 130 are rotated intermittently to this label application station 146 where the inspection and verification of the label on the bottle 130 takes place during one of the intermittent stop periods of the transfer wheel 143. As shown in FIGS. 16 and 17, the label inspection and verification apparatus or inspection means 210 basically comprises a photoscanning means including two fluorescent ultraviolet illuminating lamps 211 mounted at either side of the label inspection and verification station 146. These lamps 211 radiate ultraviolet light which illuminates the inspection and verification dots 46 and 47 as shown in FIG. 12. Dots 46 and 47 are exactly vertically aligned on labels 27, and are spaced vertically apart near edges 48 and 49 of labels 27. Dots 46 and 47 are areas approximately 0.60 inches square printed with ink not visible to the ordinary eye but which is visible only when illuminated with ultraviolet light. The light reflected by dots 46 and 47 is picked up by photoscanning unit 212 which is horizontally pivoted on pivot shaft 213. The photoscanning unit 212 is horizontally pivoted about shaft 213 by means of camming element 214. The upper and lower sections 212 and 212' of the photoscanning unit are each vertically adjusatble to accommodate various positions of dots 46 and 47 on various sizes of labels and bottles. The reflected ultraviolet light from dots 46 and 47 is picked up and transmitted to a control unit 215 by means of fiber optic cables 216 and 217.

As shown in FIG. 17, the scanning unit 212 sweeps or scans horizontally from the position shown by the solid lines to the position shown by the phantom lines. The scanning takes place at a preset vertical position, which position may be adjusted for different sizes of bottles and labels as is described above. This sweep or scan inspects and verifies the horizontal, vertical and skew positions of the label 27 on bottle 130 by picking up the reflection from only the two dots 46 and 47 in a manner described as follows.

The beginning of the sweep or scan starts a high speed counting unit within control unit 215. This counting unit (not shown in the drawings) records the length of the time of the sweep until the first reflected light, reflected from either dot, is picked up by either fiber optic bundle 216 or 217. Since the scanning unit sweeps at a rate of .001 inch per .001 seconds the length of the time period of the sweep until the first dot is reached thereby indicates the horizontal position of the label on bottle 130. If the measured horizontal distance is within preset horizontal distance limits, as set on control unit 215, then the horizontal label position will be acceptable. However, if the first reflected light is picked up too soon or too late, the label will be incorrectly horizontally positioned and thus be unacceptable.

The vertical inspection is made by the pick-up of a predetermined intensity of light from dots 46 and 47 by cables 216 and 217. The scan will be made at a preset vertical level for each size of label. The cables 216 and 217 therefore pick up a predetermined percentage or fraction of the total amount of light available from both dots. This percentage of light picked-up must be equal to or greater than a predetermined intensity set as a limit on control unit 215. In the preferred embodiment, the preset limit is 66⅔ percent or ⅔ of the total light available if the dots where perfectly aligned with cables 216 and 217. However, control unit 215 is adjustable to accept variable intensities within the range of about ⅓ to ¾ of the total light. Thus, the vertical label position may be acceptable within greater or lesser tolerances as determined by the limit setting on control unit 215. Consequently, if no light or an intensity less than the present limit is picked-up by cables 216 or 217, the control unit will indicate that the label is not in the proper vertical position since the area swept by the scanning unit, shown as 218 and 219 in FIG. 18, will not have recorded or picked-up the required amount of light.

Finally, the skew orientation of the label on the bottle 130 is measured by the length of time between the pick-up of reflected light from either the upper dot 46 or the lower 47, whichever is encountered first, to the pick-up of light from the remaining dot. Thus, the control unit 215 will record the length of time, i.e., the distance, traveled by the scanning unit between the point when light is first picked-up from either the dot 46 or 47 until the point when light is picked-up from the remaining dot either 46 or 47. The horizontal distance traveled between the two dots thus will be nearly 0, or an extremely small distance, if the label is correctly skew-oriented, i.e., has no appreciable skew, but will be some greater time or distance if the label is skewed on bottle 130. The control unit 215 will reject any labeled bottle which has horizontal, vertical or skew measurements which are outside the acceptable limits which may be preset on control unit 215. It is also apparent that bottles will also be rejected if a label is missing, or if the label does not have both top and bottom dots 46 and 47. It has been found in practice that many other bottle defects are detected which indirectly affect accurate label placement such as missing stoppers under bottle caps, misshapen bottles, crooked caps, etc. These various defects will be detected because of the inaccurate clamping or positioning of the bottle when the label is applied. Thus, if any of the measurements are outside the acceptable limits preset for that particular label, a signal will be transmitted to keep the outfeed gate 171 in the reject position, causing the bottle which is not acceptable to be transported out of the machine on the reject conveyor 190. However, if a labeled bottle is acceptable, a signal is transmitted by control unit 215 to a control means switching the outfeed gate to the accept position when the bottle reaches that point, thereby conducting the correctly labeled bottle 130 out of the machine 10 on accept conveyor 170. The control unit 215 also keeps a running count of the number of bottles accepted and rejected such that accurate records required in industries such as the pharmaceutical industry may be maintained.

Discharge apparatus

After inspection at the label inspection and verification station 146, the intermittent rotation of wheel 143 carries the bottle to the intersecting of point wheels 143 and 144 where the third and final rotational transfer wheel 144 picks-up the labeled bottle 130 and rotates it counter-clockwise to either the accept conveyor 170 or reject conveyor 190 as indicated above. If the control unit 215 indicates that a bottle is properly labeled, a signal is transmitted to a control means including the outfeed gate 171 which routes the properly labeled bottle 130 onto the accept conveyor 170 as noted above. Since the accept conveyor is moving rapidly, the bottles require stabilization to prevent them from being upset by the rapidly moving discharge conveyors 170 and 190. This necessary acceleration stabilization is provided by cammed bottle cap grippers 180 and 200.

The cammed bottle cap grippers 180 and 200 comprise endless belts 181 and 201 which are rotated on rollers 182 and 183 and 202 and 203 respectively. Rollers 182 and 202 include lobes which cause the belt 181 and 201 to be moved downwardly in their rotational path when the lobes come into contact with the belts. The lobed rollers 182 and 202 are timed to move the belts 181 and 201 vertically downwardly in order to contact the caps of the bottles which are being transported out of the apparatus 10 on conveyors 170 and 190. Thus, if a bottle is properly labeled, the accept gate will route the bottle onto the accept conveyor 170 and the lobed cam or roller 182 will rotate and move downwardly into contact with the cap of the bottle 130. Since the belt is moving at the same speed as the conveyor 170, the contact of belt 181 with the cap of bottle 130 will prevent the bottle from falling over as the bottle is accelerated on conveyor 170. As the lobed cam 172 continues its rotation, the lobe will come out of contact with the belt 181 causing the belt to come out of the contact with the cap of bottle 130 before the end of accept conveyor 170 is reached. However, since the bottle has already been accelerated to the speed of conveyor 170 at that point, the bottle will continue on conveyor 170 without any stabilization from belt 181. If another bottle is accepted, the lobed cam roller 182 will continue to rotate, thereby again bringing belt 181 into stabilizing contact with the cap of the next bottle 130 as the bottle moves on conveyor 170.

If the labeled bottle is rejected by control unit 215, the bottle will be transported past accept conveyor 170 and onward to reject conveyor 190 where stabilization will be provided by endless belt 201 of cam bottle cap gripper 200. If control unit 215 gives no signal with regard to the labeled bottle 130, the bottle will still be transported to rejection conveyor 190, since, particularly in the pharmaceutical industry, it is better to err on the side of rejecting a few good items that are questionable or non-verified rather than accepting any possible defective items for shipment and possible injury to the consuming public. The cammed bottle cap grippers 180 and 200 can be adjusted vertically to correspond to the various sizes of the bottles labeled in labeling apparatus 10.

Similarly, the rotational transfer wheels 142, 143 and 144 may be substituted by different size wheels to accommodate different size bottles. Since the scanning unit 212 is vertically adjustable on shaft 213, the label inspection verification apparatus can also accommodate various sized bottles with only a simple adjustment.

The product surface advancing apparatus and discharge apparatus are both driven by the main drive power source 15 which drives a main drive shaft 220 including cams 221 for control of the various bottle transfer and inspection processes (see FIG. 4).

As will be apparent from the above description, the labeling apparatus 10 is a unique complex machine which is capable of utilizing a continuous roll or web of labels 26 and performing all necessary operations to properly and accurately apply labels cut from the web 26 to a multitude of bottles 130. Moreover, the labeling apparatus 10 is capable of carrying out this labeling process at speeds of up to 180 or more properly and accurately labeled bottles per minute. This rate is variable within limits depending on the size of the bottles or other containers or items being labeled. The apparatus 10 may be operated by one person and is capable of rapid and easy change over to accommodate various product surface or bottle sizes.

While one preferred form of the invention has been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed as defined as follows:

1. In a labeling apparatus for the application of labels cut from a label web to product surfaces, including means for advancing said labels to a label application station including a label transfer drum, means for advancing product surfaces to said label application station, means for applying said labels to said product surfaces at said label application station, means for inspecting said labels on said product surfaces, means for discharging said product surfaces with labels applied thereto from said apparatus, and means for intermittently driving both said label and product surface advancing means including said label transfer drum, and for driving said inspections means and said discharge means, the improvement comprising: transfer finger means for transferring said labels from said intermittently driven label transfer drum to said label application station, said transfer finger means comprising a reciprocating support element including vacuum openings on the transporting surface thereof for retaining said labels during said transfer, said support element adapted to be cam operated to reciprocate vertically between two stopped positions, one at the end of said intermittently driven label advancing means on one horizontal level where the labels are received on said transporting surface, and the other at said label application station on a second horizontal level where the labels are removed and applied to the product surface by label applying means, said support element also adapted to be cam operated to reciprocate horizontally between a position behind the vertical plane containing said labels as they are positioned to be received by said support element on said intermittently driven label transfer means, a position at said vertical plane of said labels as they are so positioned such that said support element is cammed horizontally toward said label at said first horizontal level in order to adhere said label to said transporting surface just prior to being cammed vertically downwardly to said second horizontal level, and a position in front of said vertical plane immediately adjacent said product surface such that said support element is cammed horizontally toward said product surface at said second horizontal level thereby causing said labels to be adhered to said product surfaces, said support element then being cammed horizontally back to a position behind said plane of said labels on said label advancing means when said labels are in position to be received on said support element at said first horizontal level.

2. Improved labeling apparatus for the application to product surfaces of individual labels cut from a label web, said labels including an activatable adhesive coating on one side thereof, said apparatus including means for advancing said labels to a label application station, means for advancing product surfaces to said label application station, means for applying said labels to said product surfaces at said label application station, discharge means for discharging said product surfaces with said labels applied from said apparatus, and means for intermittently driving both said label and product surface advancing means and for driving said discharge means, the improvement comprising in combination:

unwind means for unwinding said label web at a constant rate;
imprinter means adapted to imprint information on said individual labels on said web;
reader means adapted to verify said imprinted information on said labels and to control said means for advancing said labels to said label application station;
knife means adapted to separate said labels from said label web in one operation;
activating means arranged to activate said adhesive coating on said labels during their intermittent advancement toward said label application station;
transfer finger means shiftable between said label advancement means and said label application station for transferring said labels from said intermittently driven label advancement means to said label application station;
rotational transfer means including a plurality of rotational transfer elements arranged to rotationally transfer said product surfaces in their normal, upright positions in a horizontal plane, to and from said label application station, said surfaces being held in a positive double three-point engagement during transfer between at least two of said elements;
clamping means operable to clamp said product surfaces for positive retention of said surfaces in one of said transfer elements, such that said product surfaces are held in exact alignment with said label application means for exact positioning of said label on said product surfaces; said unwind means comprising a freely rotatable reel adapted to removably support a roll of label web, a plurality of freely rotatable guide rollers, at least two cooperating driven rollers driven by a motor, and a photocell control means, said reel, guide rollers and driven rollers being arranged to enable said web to pass around said guide rollers and between said driven rollers, said driven rollers being responsive to said photocell control means to advance a controlled amount of label web at a constant rate, thereby providing a controlled slack amount of label web for said apparatus to operate without jerking said web off said reel.

3. Improved labeling apparatus for the application to product surfaces of individual labels cut from a label web, said labels including an activatable adhesive coating on one side thereof, said apparatus including means for advancing said labels to a label application station, means for advancing product surfaces to said label application station, means for applying said labels to said product surfaces at said label application station, discharge means for discharging said product surfaces with said labels applied from said apparatus, and means for intermittently driving both said label and product surface advancing means and for driving said discharge means, the improvement comprising in combination:

unwind means for unwinding said label web at a constant rate;
imprinter means adapted to imprint information on said individual labels on said web;
reader means adapted to verify said imprinted information on said labels and to control said means for advancing said labels to said label application station;
knife means adapted to separate said labels from said label web in one operation;
activating means arranged to activate said adhesive coating on said labels during their intermittent advancement toward said label application station;
transfer finger means shiftable between said label advancement means and said label application station for transferring said labels from said intermittently driven label advancement means to said label application station;
rotational transfer means including a plurality of rotational transfer elements arranged to rotationally transfer said product surfaces in their normal, upright positions in a horizontal plane, to and from said label application station, said surfaces being held in a positive double three-point engagement during transfer between at least two of said elements;
clamping means operable to clamp said product surfaces for positive retention of said surfaces in one of said transfer elements, such that said product surfaces are held in exact alignment with said label application means for exact positioning of said label on said product surfaces; said unwind means comprising a freely rotatable reel adapted to removably support a roll of label web, a plurality of freely rotatable guide rollers, at least two cooperating driven rollers driven by a motor, and a photocell control means, said reel, guide rollers, and driven rollers being arranged to enable said web to pass around said guide rollers and between said driven rollers, said driven rollers being responsive to said photocell control means to advance a controlled amount of label web at a constant rate, thereby providing a controlled slack amount of label web for said apparatus to operate without jerking said web off said reel; said unwind means additionally including a rotating brush driven by said motor for cleaning the surface of said label web, and said photocell control means comprising a light source and a light sensitive photocell, said photocell being adapted to unwind additional amounts of label web from said reel when said slack amount has been reduced such that light from said light source strikes and activates said photocell.

4. Improved labeling apparatus for the application to product surfaces of individual labels cut from a label web, said labels including an activatable adhesive coating on one side thereof, said apparatus including means for advancing said labels to a label application station, means for advancing product surfaces to said label application station, means for aplying said labels to said product surfaces at said label application station, discharge means for discharging said product surfaces with said labels applied from said apparatus, and means for intermittently driving both said label and product surface advancing means and for driving said discharge means, the improvement comprising in combination:

unwind means for unwinding said label web at a constant rate;
imprinter means adapted to imprint information on said individual labels on said web;
reader means adapted to verify said imprinted information on said labels and to control said means for advancing said labels to said label application station;
knife means adapted to separate said labels from said label web in one operation;
activating means arranged to activate said adhesive coating on said labels during their intermittent advancement toward said label application station;
transfer finger means shiftable between said label advancement means and said label application station for transferring said labels from said intermittently driven label advancement means to said label application station;

rotational transfer means including a plurality of rotational transfer elements arranged to rotationally transfer said product surfaces in their normal, upright positions in a horizontal plane, to and from said label application station, said surfaces being held in a positive double three-point engagement during transfer between at least two of said elements;

clamping means operable to clamp said product surfaces for positive retention of said surfaces in one of said transfer elements, such that said product surfaces are held in exact alignment with said label application means for exact positioning of said label on said product surfaces; said activating means comprising an intermittently driven drum transfer means and a quartz element heater means, and said apparatus further includes a label transfer means for transferring said labels from said knife means to said drum transfer means, said drum transfer means transferring said labels from said label transfer means to said transfer finger means, said drum transfer means including a plurality of pairs of label support shoes and vacuum means for adhering labels to said pairs of shoes, said shoes being electrically heated and in contact with only the lateral edges of said labels such that said adhesive on said lateral label edges is activated and made tacky by said heated shoes, and said qurtz element heater means being disposed immediately adjacent said drum transfer means and including a plurality of quartz heating elements which radiate sufficient heat to activate and make tacky said adhesive on the remainder of said label not in contact with said shoes.

5. Improved labeling apparatus for the application to product surfaces of individual labels cut from a label web, said labels including an activatable adhesive coating on one side thereof, said apparatus including means for advancing said labels to a label application station, means for advancing product surfaces to said label application station, means for applying said labels to said product surfaces at said label application station, discharge means for discharging said product surfaces with said labels applied from said apparatus, and means for intermittently driving both said label and product surface advancing means and for driving said discharge means, the improvement comprising in combination:

unwind means for unwinding said label web at a constant rate;

imprinter means adapted to imprint information on said individual labels on said web;

reader means adapted to verify said imprinted information on said labels and to control said means for advancing said labels to said label application station;

knife means adapted to separate said labels from said label web in one operation;

activating means arranged to activate said adhesive coating on said labels during their intermittent advancement toward said label application station;

transfer finger means shiftable between said label advancement means and said label application station for transferring said labels from said intermittently driven label advancement means to said label application station;

rotational transfer means including a plurality of rotational transfer elements arranged to rotationally transfer said product surfaces in their normal, upright positions in a horizontal plane, to and from said label application station, said surfaces being held in a positive double three-point engagement during transfer between at least two of said elements;

clamping means operable to clamp said product surfaces for positive retention of said surfaces in one of said transfer elements, such that said product surfaces are held in exact alignment with said label application means for exact positioning of said label on said product surfaces; said transfer finger means comprising a reciprocating support element including vacuum openings on the transporting surface thereof for retaining said labels during said transfer, said support element adapted to be cam-operated to reciprocate vertically between two stopped positions, one at the end of said intermittently driven label advancing means on a first horizontal level where the labels are received on said transporting surface, and the other at said label application station on a second horizontal level where the labels are removed and applied to the product surface by label applying means, said support element also adapted to be cam operated to reciprocate horizontally between a position behind the vertical plane containing said labels as they are positioned to be received by said support element on said intermittently driven label transfer means, a position at said vertical plane of said labels as they are so positioned such that said support element is cammed horizontally toward said label at said first horizontal level in order to adhere said label to said transporting surface just prior to being cammed vertically downwardly to said second horizontal level, and a position in front of said vertical plane immediately adjacent said product surface such that said support element is cammed horizontally toward said product surface at said second horizontal level thereby causing said labels to be adhered to said product surfaces, said support element then being cammed horizontally back to a position behind said plane of said labels on said label advancing means when said labels are in a position to be received on said support element at said first horizontal level.

6. Improved labeling apparatus for the application to product surfaces of individual labels cut from a label web, said labels including an activatable adhesive coating on one side thereof, said apparatus including means for advancing said labels to a label application station, means for advancing product surfaces to said label application station, means for applying said labels to said product surfaces at said label application station, discharge means for discharging said product surfaces with said labels applied from said apparatus, and means for intermittently driving both said label and product surface advancing means and for driving said discharge means, the improvement comprising in combination:

unwind means for unwinding said label web at a constant rate;

imprinter means adapted to imprint information on said individual labels on said web;

reader means adapted to verify said imprinted information on said labels and to control said means for advancing said labels to said label application station;

knife means adapted to separate said labels from said label web in one operation;

activating means arranged to activate said adhesive coating on said labels during their intermittent advancement toward said label application station;

transfer finger means shiftable between said label advancement means and said label application station for transferring said labels from said intermittently driven label advancement means to said label application station;

rotational transfer means including a plurality of rotational transfer elements arranged to rotationally transfer said product surfaces in their normal, upright positions in a horizontal plane, to and from said label application station, said surfaces being held in a positive double three-point engagement during transfer between at least two of said elements;

clamping means operable to clamp said product surfaces for positive retention of said surfaces in one of said transfer elements, such that said product surfaces are held in exact alignment with said label application means for exact positioning of said label on said product surfaces; said apparatus including a further improvement comprising inspection means for inspecting said labels on said product surfaces in order to verify the exact alignment of said labels on said surfaces; said clamping means comprising a cammed, spring-biased plurality of clamping elements spaced along the circumference of said second rotational transfer element and at least two reciprocating, cam-operated platform elements, said clamping elements being adapted to exert pressure on the tops of said product surfaces thereby securely retaining said surfaces in position, and to be moved into and out of engagement with the tops of said product surfaces by means of said platform elements, said platform elements being arranged and formed to correspond to the circumference of said second rotational transfer element such that one of said platform elements lifts each of said clamping elements as it is rotated into engagement with the first of said platform elements by said second transfer element, and another of said platform elements drops said clamping elements into engagement with the tops of said product surfaces.

7. Improved labeling apparatus for the application of labels cut from a label web to product surfaces including means for advancing said labels to a label application station, means for advancing product surfaces to said label application station and a label inspection station, means for applying said labels to said product surfaces at said label application station, discharge means, and means for intermittently driving said label and product surface advancing means and for driving said discharge means, the improvement comprising improved clamping means for clamping said product surfaces for positive retention of said surfaces in at least one of a plurality of rotationally and intermittently driven transfer elements, said elements being adapted to transfer said product surfaces from an infeed conveyor to and from said label application station and said label inspection station, said improved clamping means comprising a plurality of cammed, spring-biased, clamping elements spaced along the circumference of said one rotational transfer element, and at least two reciprocating cam-operated platform elements, said clamping elements being adapted to exert pressure on a portion of said product surfaces thereby securely retaining said surfaces in position, and to be moved into and out of engagement with said portions of said product surfaces by means of said platform elements, said platform elements being arranged and formed to correspond to the circumference of said one rotational transfer element such that one of said platform elements lifts each of said clamping elements as it is rotated into engagement with the first of said platform elements by said one transfer element, and another of said platform elements drops said clamping elements into engagement with said portions of said product surfaces.

8. Improved labeling apparatus for the application to product surfaces of individual labels cut from a label web, said labels including an activatable adhesive coating on one side thereof, said apparatus including means for advancing said labels to a label application station, means for advancing product surfaces to said label application station, means for applying said labels to said product surfaces at said label application station, discharge means for discharging said product surfaces with said labels applied from said apparatus, and means for intermittently driving both said label and product surface advancing means and for driving said discharge means, the improvement comprising in combination:

unwind means for unwinding said label web at a constant rate;

imprinter means adapted to imprint information on said individual labels on said web;

reader means adapted to verify said imprinted information on said labels and to control said means for advancing said labels to said label application station;

knife means adapted to separate said labels from said label web in one operation;

activating means arranged to activate said adhesive coating on said labels during their intermittent advancement toward said label application station;

transfer finger means shiftable between said label advancement means and said label application station for transferring said labels from said intermittently driven label advancement means to said label application station;

rotational transfer means including a plurality of rotational transfer elements arranged to rotationally transfer said product surfaces in their normal, upright positions in a horizontal plane, to and from said label application station, said surfaces being held in a positive double three-point engagement during transfer between at least two of said elements;

clamping means operable to clamp said product surfaces for positive retention of said surfaces in one of said transfer elements, such that said product surfaces are held in exact alignment with said label application means for exact positioning of said label on said product surfaces; said plurality of rotational transfer elements included in said rotational transfer means comprising a plurality of intermittently driven rotational transfer wheels, the first of said wheels having a plurality of socket spaces formed therein for receiving said product surfaces from an infeed conveyor included in said product surface-advancing apparatus, said first wheel adapted to rotate counterclockwise and to intermittently rotationally transfer said product surfaces to a second of said wheels, said surfaces being held in said positive double three-point engagement and clamped during said transfer to said second wheel by said clamping means including at least one clamping element, said second wheel including said clamping element and adapted to rotate clockwise and to transfer said product surfaces intermittently to and from said label application station and to and from a label inspection station where said inspection means inspect said labels on said product surfaces, said second wheel also being adapted to rotationally transfer said product surfaces to a third of said wheels, said clamping means arranged to release said clamping elements thereby allowing the transfer of said product surface to said third wheel, said third wheel adapted to rotate counterclockwise and to rotationally transfer said product surfaces to said discharge means, said discharge means comprising an accept conveyor and a reject conveyor, said discharge means including control means to allow said third wheel to transfer said product surface to said accept conveyor only in response to an accept signal from said inspection means, and otherwise transferring all other product surfaces to said reject conveyor.

9. Improved labeling apparatus in accordance with Claim 8 wherein said positive double three-point engagement for each product surface transferred to said second wheel is provided by two three-point support engagements formed by diametrically opposing contact surfaces contacting four opposing sides of said product surface, the first three-point support engagement of contact surfaces comprising two vertically spaced pads mounted on a spoke of said first wheel, said spoke defining a portion of one of said socket spaces, said pads being diametrically opposed by a reciprocating spring block contacting said product surface on a line passing through the space separating said vertically spaced pads such that a triangular support arrangement is formed for contacting said product surface on opposing ends of a first diameter of said product surface, said spring block being adapted to reciprocate into contact with said product surface and subsequently reciprocate out of the path of travel of said product surface on said second wheel, and the second three-point support engagement of contact surfaces comprising two vertically spaced support members forming another portion of said socket space, said support members being diametrically opposed by a spring-biased contact mechanism contacting said product surface on a line passing through the space separating said vertically spaced support members such that a second triangular support arrangement is formed for contacting said product surface on opposing ends of a second diameter of said product surface at right angles to said first diameter, said spring biased contact mechanism being arranged to be pivoted out of the path of travel of said product surface on said second wheel by said product surface as said surface is rotationally transferred by said second wheel, said two three-point support engagements securely holding said product surface in position to be clamped on said second wheel by said clamping means.

10. Improved labeling apparatus in accordance with Claim 9 wherein said infeed conveyor includes a cap detection means for determining that each product surface on said infeed conveyor is capped and ready for the application of a label.

11. Improved labeling apparatus in accordance with Claim 10 wherein said infeed conveyor further includes a reciprocating retarding means for decelerating each product surface as it enters said first wheel such that said product surfaces are slowed to prevent accidental breakage upon entering said socket spaces in said first wheel.

12. Improved labeling apparatus for the application of labels cut from a label web to product surfaces including means for advancing said labels to a label application station, means for applying said labels to product surfaces at said label application station, means for inspecting said labels on product surfaces, means for discharging product surfaces with said labels applied thereto from said apparatus, means for intermittently driving a product surface advancing means and said label advancing means and for driving said inspection means and said discharge means, the improvement comprising improved product surface advancing means including at least two adjacent, cooperative, rotational transfer wheels for transferring in a horizontal plane, said product surfaces in their normal, upright positions to and from said label application station, said wheels including means for transferring said product surfaces between said wheels including a plurality of circumferentially spaced product surface retaining openings, said product surface advancing means also including means for retaining said product surfaces in a positive, double three-point engagement during the transfer of said product surfaces between said wheels such that each product surface will be held in the same normal upright position by each transfer wheel.

13. Improved labeling apparatus in accordance with Claim 12 wherein said product surface advancing means further includes an infeed conveyor and a clamping means for retaining said product surfaces on at least one of said wheels, the first of said rotational transfer wheels has a plurality of socket spaces comprising said product surface retaining openings formed therein for receiving said product surfaces from an infeed conveyor included in said product surface-advancing apparatus, said first wheel being adapted to rotate counterclockwise for rotationally transferring said product surfaces to a second of said wheels, said surfaces being held in said positive double three-point engagement and clamped by said clamping means during said transfer to and by said second wheel, said second wheel being adapted to rotate clockwise for transferring said product surfaces intermittently to and from said label application station and to and from a label inspection station where said inspection means inspect said labels on said product surfaces, said second wheel also being adapted to rotationally transfer said product surfaces to a third of said wheels, said clamping means being releasable during said transferring operation, and allowing the transfer of said product surface to said third wheel, said third wheel being adapted to rotate counterclockwise for rotationally transferring said product surfaces to said discharge means, said discharge means comprising an accept conveyor and a reject conveyor, said discharge means including control means to allow said third wheel to transfer said product surface to said accept conveyor only in response to an accept signal from said inspection means, and otherwise transferring all other product surfaces to said reject conveyor.

14. Improved labeling apparatus in accordance with Claim 13 wherein said positive double three-point engagement for each product surface transferred to said second wheel is provided by two three-point support engagements formed by diametrically opposing contact surfaces contacting four opposing sides of said product surface, the first three-point support engagement of contact surfaces comprising two vertically spaced pads mounted on a spoke of said first wheel, said spoke defining a portion of one of said socket spaces, said pads being diametrically opposed by a reciprocating spring block contacting said product surface on a line passing through the space separating said vertically spaced pads such that a triangular support arrangement is formed for contacting said product surface on opposing ends of a first diameter of said product surface, said spring block being adapted to reciprocate into contact with said product surface and subsequently reciprocate out of the path of travel of said product surface on said second wheel, and the second three-point support engagement of contact surfaces comprising two vertically spaced support members forming another portion of said socket space, said support members being diametrically opposed by a spring-biased contact mechanism contacting said product surface on a line passing through the space separating said vertically spaced support members such that a second triangular support arrangement is formed for contacting said product surface on opposing ends of a second diameter of said product surface at right angles to said first diameter, said spring-biased contact mechanism being arranged to be pivoted out of the path of travel of said product surface on said second wheel by said product surface as said surface is rotationally transferred by said second wheel, said two three-point support engagements securely holding said product surface in position to be clamped on said second wheel by said clamping means.

15. Improved labeling apparatus for the application of labels cut from a label web having periodic scrap sections to product surfaces including means for advancing said labels to a label application station, means for applying said labels to said product surfaces at said label application station, and means for intermittently driving a product surface advancing means and said label advancing means, the improvement comprising improved knife means for the separation of said labels and said periodic scrap sections in one operation, said knife means comprising a double-bladed knife, the first of said blades being the first blade to be encountered by said label web as it flows over said blades, at least one of said blades being adjustable along the direction of flow of said label web with respect to the other of said blades to accommodate various label sizes such that the first of said blades is arranged to separate the labels to be applied to said product surfaces from said label web and the second of said blades is arranged to simultaneously separate any periodically occurring scrap sections from said labels, said first and second blades operating simultaneously and in unison at all times such that said label web, label and scrap section, if any, are separated at one time and on the same stroke of said simultaneously operating blades.

16. Improved labeling apparatus in accordance with Claim 15 wherein said knife further includes first and second knife blade supports, first and second knife edge blocks, a cam-operated reciprocating means, and a threaded rod, said first and second knife blades are mounted on first and second knife blade supports, said blade supports being reciprocally mounted with respect to and biased away from first and second knife edge blocks, each of said blocks including a knife edge which cooperates with the respective knife blade, each of said blades being reciprocated in unison with the other toward and away from said knife edges by a cam-operated reciprocating means, said second blade support and edge block being adjustable with respect to said first blade support and edge block by means of a threaded rod, and said reciprocating means including a linkage which moves both ends of each blade toward and away from said respective knife edges exactly in unison with the other end of the same blade and with the other blade.

17. Improved labeling apparatus capable of application to product surfaces of individual labels cut from a label web having periodic scrap sections and capable of application to product surfaces of individual labels cut from a label web without such scrap sections, said labels including an activatable adhesive coating on one side thereof, said apparatus including means for advancing said labels to a label application station, means for advancing products surfaces to said label application station, means for applying said labels to said product surfaces at said label application station, discharge means for discharging said product surfaces with said labels applied from said apparatus, and means for intermittently driving both said label and product surface advancing means and for driving said discharge means, the improvement comprising in combination:

unwind means for unwinding said label web at a constant rate;
imprinter means adapted to imprint information on said individual labels on said web;
reader means adapted to verify said imprinted information on said labels and to control said means for advancing said labels to said label application station;
knife means adapted to separate said labels and any of said periodic scrap sections from said label web in one operation;
activating means arranged to activate said adhesive coating on said labels during their intermittent advancement toward said label application station;
transfer finger means shiftable between said label advancement means and said label application station for transferring said labels from said intermittently driven label advancement means to said label application station;
rotational transfer means including a plurality of rotational transfer elements arranged to rotationally transfer said product surfaces in their normal, upright positions in a horizontal plane, to and from said label application station, said surfaces being held in a positive double three-point engagement during transfer between at least two of said elements;
clamping means operable to clamp said product surfaces for positive retention of said surfaces in one of said transfer elements, such that said product surfaces are held in exact alignment with said label application means for exact positioning of said label on said product surfaces.

18. Improved labeling apparatus in accordance with claim 17 wherein said apparatus includes a further improvement comprising inspection means for inspecting said labels on said product surfaces in order to verify the exact alignment of said labels on said surfaces.

19. Improved labeling apparatus in accordance with claim 18 wherein said labels each include two vertically spaced and aligned verification dots printed with ink visible only when illuminated with ultraviolet light, and said inspection means comprises a pivotally driven photoscanning unit including at least two fiber-optic cables, at least one source of ultraviolet light, and a control unit, said cables adapted to pick up and transmit fluorescing light from said source produced by said verification dots imprinted on said labels to said control unit, said photoscanning unit adapted to be horizontally pivotally driven such that the face of said label is scanned for said fluorescing light from said dots in repeating scanning sweeps, one sweep for each products surface, said control unit including an electronic counting unit arranged to be started at the beginning of each of said scanning sweeps, said counting unit adapted to measure the time from the beginning of each sweep to the pick-up of said fluorescing light from each dot, said photoscanning unit adapted to horizontally pivot an exact distance in any exact time period such that said measured time periods may be recorded by said control unit and automatically translated into measured distances thereby providing the measurement of the horizontal label position by determining the distance to the pick-up of the first fluorescing light from either dot, the measurement of the vertical label position by the pick-up of a predetermined intensity of fluorescing light at a preset horizontal level from said dots, and the skew label position by determining the distance between the pick-up of fluorescing light from the first of either dot encountered and the pick-up of fluorescing light from the remaining dot encountered, said control unit being adapted to compare each of said distances and measurements for determining said horizontal, vertical and skew label positions to preset distance and intensity limits in said control unit, said product surfaces having labels with said measured distances and intensities within said limits being the only product surfaces accepted.

20. Improved labeling appartus in accordance with claim 17 wherein said reader means comprises an enclosure adjustably mounted over said label web and a read-out unit, said knife means includes a switch, said product surface advancing means includes signal means for indicating the presence of a bottle and said label advancing appartus includes a label jam switch for signaling a jam of labels in said label advancing apparatus, said label web including register areas on each label, said enclosure adjustably supporting a comparison reading unit adapted to verify the imprint printed by said imprinter means and a separation reading unit adapted to control the intermittent feeding of said label web to said knife means in response to light from said register areas on said label, said read-out unit being operable to record said light from said comparison reading unit and said separation reading unit and to produce an electronic signal in response to each of said recordings, said web adapted to be fed to said knife means only after the camming of said switch included with said knife means, and the production of said signals from said comparison reading unit, said product surface advancing apparatus signal means, and said label jam switch.

21. Improved labeling apparatus in accordance with claim 20 wherein said comparison reading unit comprises two adpustably mounted bifurcated fiber optic cables each having two sections and an illumination source, said cables being arranged to illuminate portions of said label by transmitting light from said illumination source, one section of one of said cables illuminating the portion imprinted by said imprinter means and one section of the other of said cables illuminating the unprinted portion of said label immediately adjacent said imprinted portion of said label, the remaining sections of said cables being arranged to transmit any light reflected by said imprinted and unprinted portions to said read-out unit, said remaining section of said one cable transmitting light reflected by said imprinted portion and said remaining section of said other cable transmitting light reflected by said unprinted portion, said read-out unit being operable to compare the intensity of light transmitted by said remaining sections of said cables such that, if a large enough difference in intensities of light is indicated, a signal will be produced indicating said label has been imprinted.

22. Improved labeling apparatus in accordance with claim 20 wherein said separation reading unit comprises an adjustably mounted fiber optic cable and an ultarviolet illuminating source, said register areas comprising register marks printed on each of said labels on said web with ink visible only when illuminated with ultraviolet light, said ultraviolet source adapted to illuminate said register marks as said label web passes beneath said ultraviolet source, and said cable arranged to transmit any fluorescing light from said marks to said read-out unit, said read-out unit being operable to produce a signal in response to said transmitted fluorescing light which stops the feeding of said web into said knife means by said label advancing means.

23. Improved labeling apparatus in accordance with claim 20 wherein said separation reading unit comprises an adjustably mounted fiber optic cable and an ultraviolet illuminating source, said register areas comprising register holes formed in said labels, said apparatus including a support surface adjacent said reading means for supporting said label web, said surface including coated areas visible only when illuminated with ultraviolet light, said ultraviolet source adapted to illuminate said coated areas when said register holes are aligned therewith as said label web passes beneath said ultraviolet source, said cable arranged to transmit any flourescing light from said coated areas to said read-out unit when said register holes are aligned therewith, said read-out unit being operable to produce a signal in response to said transmitted fluorescing light which stops the feeding of said web into said knife means by said label advancing means.

24. Improved labeling apparatus in accordance with claim 17 wherein said knife means comprises a double-bladed knife, the first of said blades being the first blade to be encountered by said label web as it flows over said blades, at least one of said blades being adjustable along the direction of flow of said label web with respect to the other of said blades to accommodate various label sizes such that the first of said blades is arranged to separate the labels to be applied to said product surfaces from said label web and the second of said blades is arranged to simultaneously separate any periodically occurring scrap sections from said labels, said first and second blades operating simultaneously and in unison at all times such that said label web, label, and scrap section, if any, are separated at one time and on the same stroke of said simultaneously operating blades.

25. Improved labeling apparatus in accordance with claim 24 wherein said knife further includes first and second knife blade supports, first and second knife edge blocks, a cam-operated reciprocating means, and a threaded rod, said first and second knife blades are mounted on first and second knife blade supports, said blade supports being reciprocally mounted with respect to and biased away from first and second knife edge blocks, each of said blocks including a knife edge which cooperates with the respective knife blade, each of said blades being reciprocated in unison with the other toward and away from said knife edges by a cam-operated reciprocating means, said second blade support and edge block being adjustable with respect to said first blade support and edge block by means of a threaded rod, and said reciprocating means including a linkage which moves both ends of each blade toward and away from said respective knife edges exactly in unison with the other end of the same blade and with the other blade.

26. Improved labeling apparatus for the application of labels cut from a label web to product surfaces including means for advancing said labels to a label application station, means for applying said labels to said product surfaces at said label application station, means for inspecting said labels on said product surfaces, means for discharging said product surfaces with labels applied thereto from said apparatus, means for intermittently driving a product surface advancing means and said label advancing means, and for driving said inspection means and said discharge means, the improvement comprising improved product surface advancing means including three adjacent, cooperative, rotational transfer wheels for transferring in a horizonal plane said product surfaces in their normal, upright positions to and from said label application station, said wheels including means for transferring said product surfaces between said wheels including a plurality of circumferentially spaced product surface retaining openings, with the first of said wheels having less than twice the circumference and twice the number of said openings as said second and third wheels, said product surface advancing means also including means for retaining said product surfaces in a positive, double three-point engagement during the transfer of said product surfaces between said three wheels such that each product surface will be held in the same normal, upright position by each transfer wheel.

27. Improved labeling apparatus in accordance with claim 26 wherein said product surface advancing means further includes an infeed conveyor and a clamping means for retaining said product surfaces on at least one of said wheels, the first of said rotational transfer wheels having a plurality of socket spaces comprising said product surface retaining openings formed therein for receiving said product surfaces from an infeed conveyor included in said product surface-advancing apparatus, said first wheel being adapted to rotate counterclockwise for rotationally transferring said product surfaces to a second of said wheels, said surfaces being held in said positive double three-point engagement and clamped by said clamping means during said transfer to and by said second wheel, said second wheel being adapted to rotate clockwise for transferring said product surfaces intermittently to and from said label application station and to and from a label inspection station where said inspection means inspect said labels on said product surfaces, said second wheel also being adapted to rotationally transfer said product surfaces to a third of said wheels, said clamping means being releasable during said transferring operation, and allowing the transfer of said product surface to said third wheel, said third wheel being adapted to rotate counterclockwise for rotationally transferring said product surfaces to said discharge means, said discharge means comprising an accept conveyor and a reject conveyor, said discharge means including control means to allow said third wheel to transfer said product surface to said accept conveyor only in response to an accept signal from said inspection means, and otherwise transferring all other product surfaces to said reject conveyor.

28. Improved labeling apparatus in accordance with claim 27 wherein said positive double three-point engagement for each product surface transferred to said second wheel is provided by two three-point support engagements formed by diametrically opposing contact surfaces contacting four opposing sides of said product surface, the first three-point support engagement of contact surfaces comprising two vertically spaced pads mounted on a spoke of said first wheel, said spoke defining a portion of one of said socket spaces, said pads being diametrically opposed by a reciprocating spring block contacting said product surface on a line passing through the space separating said vertically spaced pads such that a triangular support arrangement is formed for contacting said product surface on opposing ends of a first diameter of said product surface, said spring block being adapted to reciprocate into contact with said product surface and subsequently reciprocate out of the path of travel of said product surface on said second wheel, and the second three-point support engagement of contact surfaces comprising two vertically spaced support members forming another portion of said socket space, said support members being diametrically opposed by a spring-biased contact mechanism contacting said product surface on a line passing through the space separating said vertically spaced support members such that a second triangular support arrangement is formed for contacting said product surface on opposing ends of a second diameter of said product surface at right angles to said first diameter, said spring-biased contact mechanism being arranged to be pivoted out of the path of travel of said product surface on said second wheel by said product surface as said surface is rotationally transferred by said second wheel, said two three-point support engagements securely holding said product surface in position to be clamped on said second wheel by said clamping means.

References Cited

UNITED STATES PATENTS

| | | | |
|---|---|---|---|
| 3,586,570 | 6/1971 | Solomon et al. | 156—566 |
| 3,707,423 | 12/1972 | Davies et al. | 156—567 |
| 3,519,835 | 7/1970 | Davies | 156—354 |
| 3,451,874 | 6/1969 | Solomon et al. | 156—567 |

CHARLES E. VAN HORN, Primary Examiner

C. WESTON, Assistant Examiner

U.S. Cl. X.R.

156—384, 566, 567

PO-1050
(5/69)

UNITED STATES PATENT OFFICE
CERTIFICATE OF CORRECTION

Patent No. 3,843,440     Dated October 22, 1974

Inventor(s) John R. Davies

It is certified that error appears in the above-identified patent and that said Letters Patent are hereby corrected as shown below:

Column 5, lines 43 and 44:

Omit "and also by the drum"

Column 7, line 22:

Omit "normally visible using visible range light. How-" and substitute therefor ---visible only when illuminated by ultraviolet light---

Column 8, line 3:

"comfparison" should be ---comparison---

Column 16, line 52:

After the word "lower" insert ---dot---

Column 17, line 49:

The numeral "172" should be changed to ---182---

Signed and sealed this 14th day of January 1975.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,843,440　　　　　Dated October 22, 1974

Inventor(s) John R. Davies

It is certified that error appears in the above-identified patent and that said Letters Patent are hereby corrected as shown below:

Column 6, line 72;

"3,358,570" should be --3,586,570--.

Signed and Sealed this second Day of September 1975

[SEAL]

Attest:

RUTH C. MASON
Attesting Officer

C. MARSHALL DANN
Commissioner of Patents and Trademarks